(12) United States Patent
Gao et al.

(10) Patent No.: US 12,041,264 B2
(45) Date of Patent: *Jul. 16, 2024

(54) METHOD AND APPARATUS FOR VIDEO ENCODING AND DECODING

(71) Applicant: TENCENT TECHNOLOGY (SHENZHEN) COMPANY LIMITED, Shenzhen (CN)

(72) Inventors: Xinwei Gao, Shenzhen (CN); Xunan Mao, Shenzhen (CN); Chenchen Gu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 167 days.

This patent is subject to a terminal disclaimer.

(21) Appl. No.: 17/704,804

(22) Filed: Mar. 25, 2022

(65) Prior Publication Data

US 2022/0217398 A1 Jul. 7, 2022

Related U.S. Application Data

(63) Continuation of application No. 16/990,837, filed on Aug. 11, 2020, now Pat. No. 11,323,739, which is a (Continued)

(30) Foreign Application Priority Data

Jun. 20, 2018 (CN) .......................... 201810636854.7

(51) Int. Cl.
*H04N 19/52* (2014.01)
*H04N 19/172* (2014.01)
*H04N 19/176* (2014.01)

(52) U.S. Cl.
CPC .......... *H04N 19/52* (2014.11); *H04N 19/172* (2014.11); *H04N 19/176* (2014.11)

(58) Field of Classification Search
CPC .... H04N 19/52; H04N 19/172; H04N 19/176; H04N 19/523; H04N 19/53;
(Continued)

(56) References Cited

U.S. PATENT DOCUMENTS 5,414,469 A 5/1995 Gonzales et al.
9,743,090 B2 8/2017 George et al.
(Continued)

FOREIGN PATENT DOCUMENTS

CN 1072051 A 5/1993
CN 1622634 A 6/2005
(Continued)

OTHER PUBLICATIONS

The World Intellectual Property Organization (WIPO) International Search Report for PCT/CN2019/089808 dated Sep. 3, 2019 7 Pages (including translation).

*Primary Examiner* — Jeffery A Williams
(74) *Attorney, Agent, or Firm* — ANOVA LAW GROUP, PLLC

(57) ABSTRACT

A video coding method includes obtaining a current frame from a plurality of video frames, from which at least two or more video frames from have different resolutions; determining an initial motion vector (MV) corresponding to each block to be encoded in the current frame at a corresponding resolution; and determining a target MV resolution according to a resolution configuration of the current frame to
(Continued)

represent a target resolution. The method also includes determining a target MV corresponding to each block in the current frame at the target resolution represented by the target MV resolution; obtaining a motion vector prediction (MVP) corresponding to each block in the current frame at the target resolution; and encoding the current frame according to a motion vector difference (MVD) between each target MV and the corresponding MVP such that the MV and the corresponding MVP are at a same resolution.

20 Claims, 9 Drawing Sheets

Related U.S. Application Data continuation of application No. PCT/CN2019/089808, filed on Jun. 3, 2019.

(58) Field of Classification Search
CPC .... H04N 19/124; H04N 19/147; H04N 19/61; H04N 19/625; H04N 19/91; H04N 19/119; H04N 19/184
USPC ...................................................... 375/240.16
See application file for complete search history.

(56) References Cited

U.S. PATENT DOCUMENTS

| | | | |
|---|---|---|---|
| 11,323,739 B2 * | 5/2022 | Gao | ...................... H04N 19/52 |
| 2005/0111546 A1 | 5/2005 | Seo | |
| 2005/0226335 A1 | 10/2005 | Lee et al. | |
| 2008/0049844 A1 | 2/2008 | Liu et al. | |
| 2010/0208086 A1 | 8/2010 | Kothandaraman et al. | |
| 2010/0329345 A1 | 12/2010 | Andersson et al. | |
| 2011/0050935 A1 | 3/2011 | Mukherjee | |
| 2012/0207220 A1 | 8/2012 | Kim et al. | |
| 2014/0140407 A1 | 5/2014 | Yu et al. | |
| 2015/0229948 A1 | 8/2015 | Puri et al. | |
| 2016/0255355 A1 | 9/2016 | Andersson et al. | |
| 2016/0277739 A1 | 9/2016 | Puri et al. | |
| 2019/0253704 A1 | 8/2019 | Mao et al. | |

FOREIGN PATENT DOCUMENTS

| | | |
|---|---|---|
| CN | 1684517 A | 10/2005 |
| CN | 101938652 A | 1/2011 |
| CN | 103813174 A | 5/2014 |
| CN | 107155107 A | 9/2017 |
| CN | 108833923 A | 11/2018 |
| CN | 108848380 A | 11/2018 |

* cited by examiner

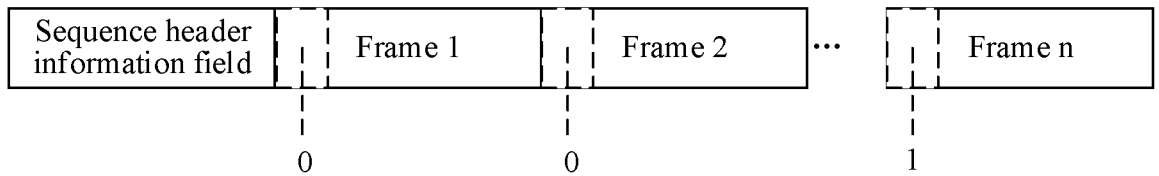
FIG. 6
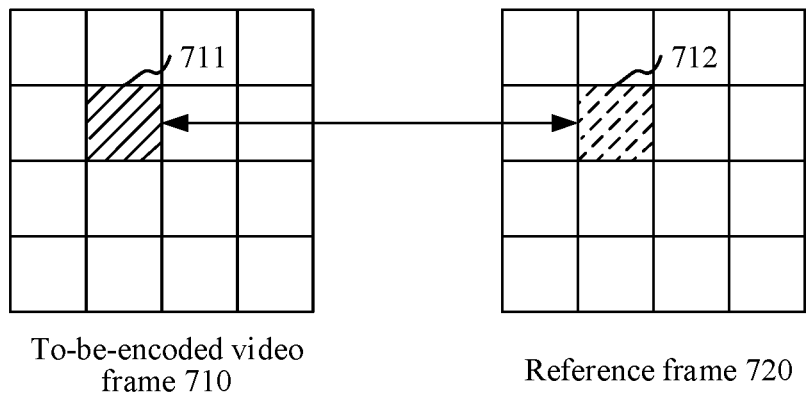
FIG. 7
| | ... | ... | ... | ... | ... | ... | |
|---|---|---|---|---|---|---|---|
| ... | C1 | c11 | A1 | a11 | B1 | b11 | ... |
| ... | c13 | c12 | a13 | a12 | b13 | b12 | ... |
| ... | C2 | c21 | A2 | a21 | B2 | b21 | ... |
| ... | c23 | c22 | a23 | a22 | b13 | b22 | ... |
| ... | C3 | c31 | A3 | a31 | B3 | b31 | ... |
| ... | c33 | c32 | a33 | a32 | b33 | b32 | ... |
| | ... | ... | ... | ... | ... | ... | |
FIG. 8
| C1 | ... | ... | ... | A1 | ... | ... | ... | B1 |
|---|---|---|---|---|---|---|---|---|
| ... | ... | ... | ... | ... | ... | ... | ... | ... |
| ... | ... | ... | ... | ... | ... | ... | ... | ... |
| ... | ... | ... | ... | ... | ... | ... | ... | ... |
| C2 | ... | ... | ... | A2 | a4 | a8 | a12 | B2 |
| ... | ... | ... | ... | a1 | a5 | a9 | a13 | ... |
| ... | ... | ... | ... | a2 | a6 | a10 | a14 | ... |
| ... | ... | ... | ... | a3 | a7 | a11 | a15 | ... |
| C3 | ... | ... | ... | A3 | ... | ... | ... | B3 |
FIG. 9

METHOD AND APPARATUS FOR VIDEO ENCODING AND DECODING

RELATED APPLICATIONS

This application is a continuation application of U.S. patent application Ser. No. 16/990,837, filed on Aug. 11, 2020. U.S. patent application Ser. No. 16/990,837 is a continuation application of PCT Patent Application No. PCT/CN2019/089808, filed on Jun. 3, 2019, which claims priority to Chinese Patent Application No. 201810636854.7, entitled "VIDEO ENCODING METHOD AND APPARATUS, VIDEO DECODING METHOD AND APPARATUS, COMPUTER DEVICE, AND STORAGE MEDIUM" filed on Jun. 20, 2018, contents of all of the above applications are incorporated herein by reference in their entirety.

FIELD OF THE TECHNOLOGY

This application relates to the field of computer technologies and, in particular, to a video encoding method and apparatus, a video decoding method and apparatus, a computer device, and a storage medium.

BACKGROUND

With the development of digital media technologies and computer technologies, videos are applied to a variety of fields, such as mobile communication, online surveillance, and web television. With the improvement of hardware performance and screen resolution, users have an increasing requirement for high-definition videos.

Under the condition of limited bandwidth, video quality may be poor in some scenarios as a conventional encoder encodes video frames indiscriminately. For example, at 750 kbps, when all video frames are encoded indiscriminately, encoders of H.264/H.265/iOS and the like all have a problem of poor quality of some video frames. The disclosed methods and systems are directed to solve one or more problems set forth above and other problems.

SUMMARY

Embodiments of the present disclosure provide a video encoding method and apparatus, a video decoding method and apparatus, a computer device, and a storage medium, which can resolve a problem of poor video quality caused by conventional video encoding and decoding methods.

One aspect of the present disclosure includes a video coding method for a computer device. The method includes obtaining a current frame from a plurality of video frames to be encoded, at least two or more video frames from the plurality of video frames having different resolutions; determining an initial motion vector (MV) corresponding to each block to be encoded in the current frame at a corresponding resolution; and determining a target MV resolution according to a resolution configuration of the current frame to represent a target resolution. The method also includes determining a target MV corresponding to each block to be encoded in the current frame at the target resolution represented by the target MV resolution; obtaining a motion vector prediction (MVP) corresponding to each block to be encoded in the current frame at the target resolution; and encoding the current frame according to a motion vector difference (MVD) between each target MV and the corresponding MVP such that the MV and the corresponding MVP are at a same resolution.

Another aspect of the present disclosure includes a video coding method for a computer device. The method includes obtaining encoded data corresponding to a current frame; extracting a motion vector difference (MVD) corresponding to each block to be decoded in the current frame in the encoded data, a resolution corresponding to the MVD being a target resolution corresponding to a resolution configuration; and determining a motion vector prediction (MVP) corresponding to each block to be decoded. The method also includes processing the MVD and the MVP corresponding to each block to be decoded at a same resolution after determining that a resolution of the current frame is inconsistent with the target resolution, to obtain a motion vector (MV) corresponding to the corresponding block to be decoded and at the resolution of the current frame; determining a reference block corresponding to each block to be decoded according to an MV corresponding to each block to be decoded; and obtaining a reconstructed video frame according to each reference block and the encoded data.

Another aspect of the present disclosure includes non-transitory computer-readable storage medium storing computer program instructions executable by at least one processor to perform: obtaining a current frame from a plurality of video frames to be encoded, at least two or more video frames from the plurality of video frames having different resolutions; determining an initial motion vector (MV) corresponding to each block to be encoded in the current frame at a current resolution of the current frame; determining a target MV resolution according to a resolution configuration of the current frame to represent a target resolution; determining a target MV corresponding to each block to be encoded in the current frame at the target resolution represented by the target MV resolution; obtaining a motion vector prediction (MVP) corresponding to each block to be encoded in the current frame and at the target resolution; and encoding the current frame according to a motion vector difference (MVD) between each target MV and the corresponding MVP such that the MV and the corresponding MVP are at a same resolution.

Other aspects of the present disclosure can be understood by those skilled in the art in light of the description, the claims, and the drawings of the present disclosure.

BRIEF DESCRIPTION OF THE DRAWINGS

FIG. 6 is a schematic diagram of encoded data according to an embodiment of the present disclosure;

FIG. 7 is a schematic principle diagram of selecting an MVP according to an embodiment of the present disclosure;

FIG. 8 is a schematic diagram of interpolation of a current reference frame according to an embodiment of the present disclosure;

FIG. 9 is a schematic diagram of interpolation of a current reference frame according to an embodiment of the present disclosure;

DETAILED DESCRIPTION

To make objectives, technical solutions, and advantages of the present disclosure clearer and more comprehensible, the following further describes the present disclosure in detail with reference to the accompanying drawings. It is to be understood that the specific embodiments described herein are merely used for explaining the present disclosure but are not intended to limit the present disclosure.

It may be understood that the terms such as "first", "second", and "third" used in the present disclosure may be used for describing various elements in this specification. However, the elements are not limited by the terms unless otherwise specified. The terms are merely used for distinguishing one element from another element. For example, a first vector transformation coefficient may be referred to as a second vector transformation coefficient without departing from the scope of the present disclosure, and similarly, the second vector transformation coefficient may be referred to as the first vector transformation coefficient.

Figure 1:
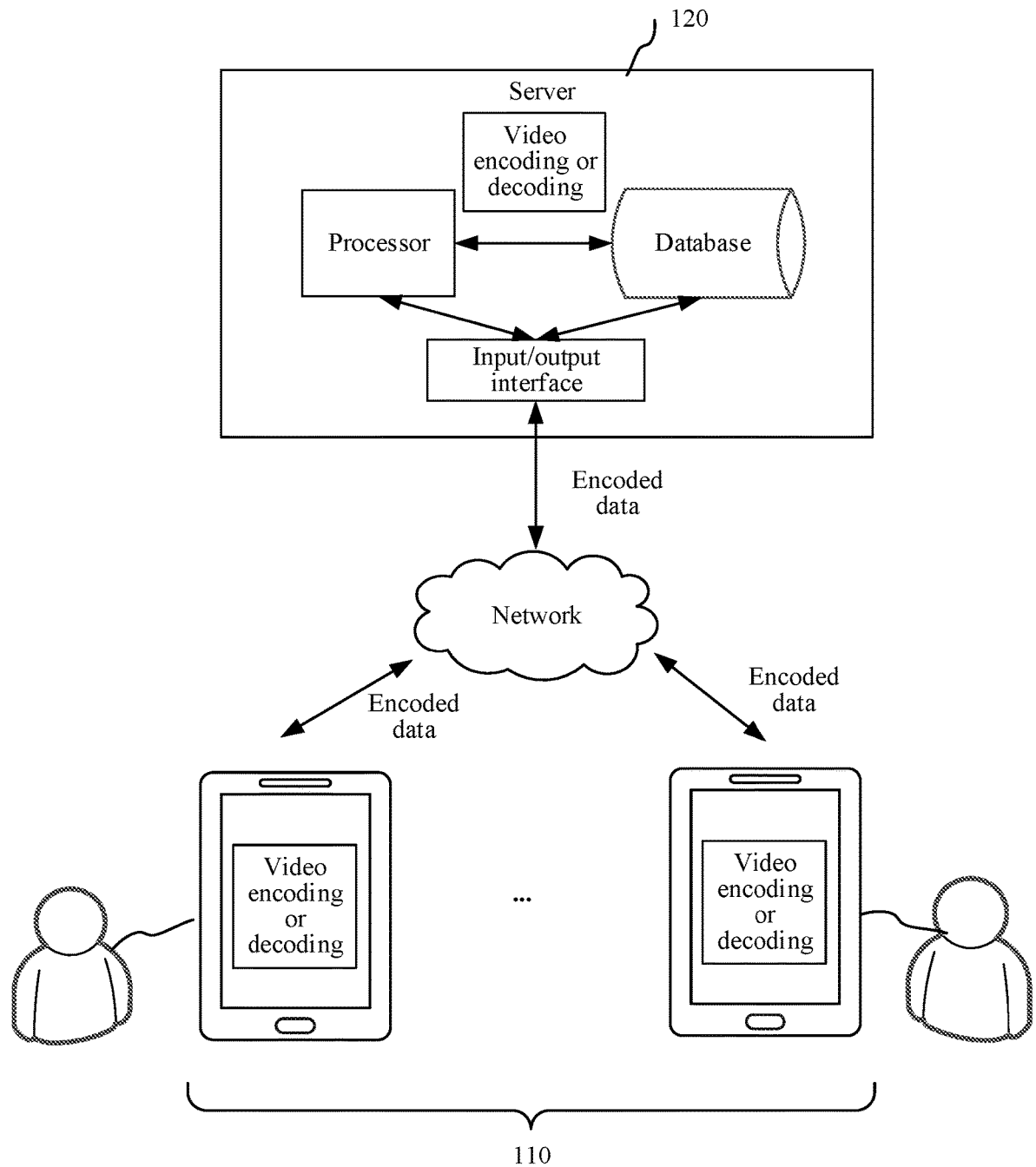
FIG. 1 is a diagram of an application environment of a video coding method according to an embodiment of the present disclosure.

FIG. 1 is a diagram of an application environment of a video encoding method and/or a video decoding method according to an embodiment. As shown in FIG. 1, the application environment includes a terminal 110 and a server 120.

The video encoding method and/or the video decoding method may be completed in the terminal 110 or the server 120. The terminal 110 may encode an input original video frame by using the video encoding method provided in the embodiments of the present disclosure, and then send encoded data to the server 120, and may also receive encoded data from the server 120, decode the encoded data by using the video decoding method provided in the embodiments of the present disclosure, and then generate a decoded video frame. The server 120 may encode the original video frame. In this case, the video encoding method is completed by the server 120. If the server 120 needs to decode the encoded data, the video decoding method is completed by the server 120. Certainly, the server 120 may alternatively receive the encoded data sent by the terminal 110 and send the encoded data to a corresponding receiving terminal for decoding by the receiving terminal.

The terminal 110 and the server 120 are connected through a network. The server 120 may communicate with, for example, receive the encoded data from or send the encoded data to, the terminal 110 through an input/output interface. The terminal 110 may be specifically a desktop terminal or a mobile terminal. The mobile terminal may be specifically, but not limited to, at least one of a mobile phone, a tablet computer, a notebook computer, and the like. The server 120 may be implemented by using an independent server or a server cluster that includes a plurality of servers.

The terminal 110 or the server 120 may perform video encoding by using an encoder, or perform video decoding by using a decoder. Alternatively, the terminal 110 or the server 120 may perform video encoding by using a processor running a video encoding program, or perform video decoding by using a processor running a video decoding program. After receiving, through the input interface, encoded data sent by the terminal 110, the server 120 may directly transfer the encoded data to the processor for decoding, or may store the encoded data in a database for subsequent decoding. After encoding the original video frame by using the processor and obtaining the encoded data, the server 120 may directly send the encoded data to the terminal 110 through the output interface, or may store the encoded data in the database for subsequent transfer.

Figure 2:
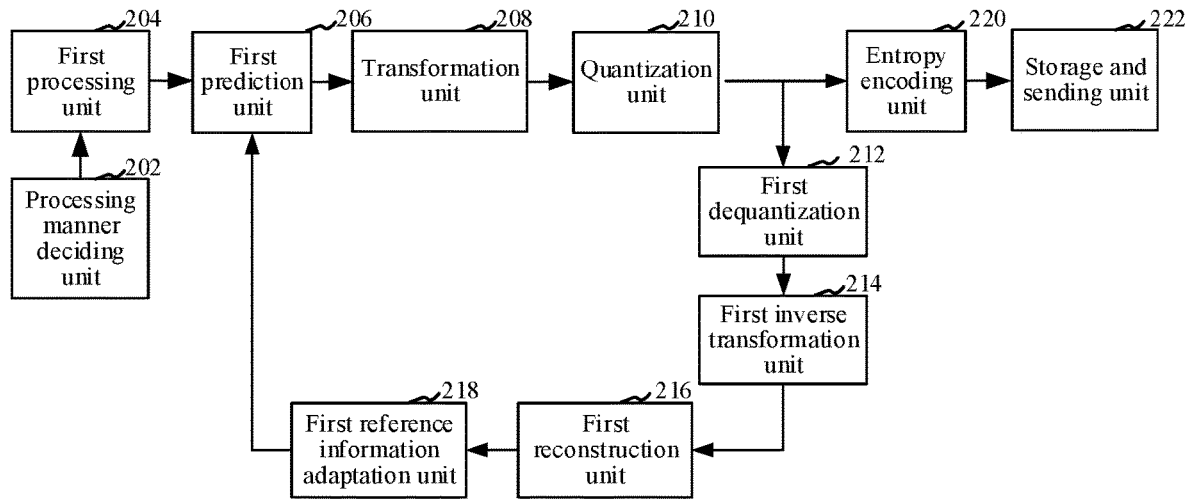
FIG. 2 is an encoding framework diagram corresponding to a video encoding method according to an embodiment of the present disclosure.

FIG. 2 is an encoding framework diagram corresponding to a video encoding method according to an embodiment. The video encoding method provided in one embodiment of the present disclosure may be obtaining and encoding each original video frame of an input video frame sequence to obtain corresponding encoded data, and storing and/or sending the encoded data by using a storage and sending unit 222. A processing manner deciding unit 202 may make a processing manner decision on the original video frame, to obtain a processing manner corresponding to the original video frame. A first processing unit 204 may process the original video frame in the processing manner obtained by the processing manner deciding unit 202, to obtain a to-be-encoded video frame. A first prediction unit 206 may perform intra-frame prediction or inter-frame prediction on each to-be-encoded block of the to-be-encoded video frame at a resolution of the to-be-encoded video frame, obtain a predicted pixel value according to an image value of a reference block corresponding to the to-be-encoded block, determine an MV (motion vector) corresponding to the to-be-encoded block, and obtain a pixel residual through subtraction between an actual pixel value of the to-be-encoded block and the predicted pixel value, the MV representing a displacement of the to-be-encoded block relative to the reference block.

A transformation unit 208 transforms the pixel residual and vector information from a space domain to a frequency domain, and may encode a transformation coefficient. A transformation method may be discrete Fourier transform, discrete cosine transform, or the like. The vector information may be an actual MV or an MVD (motion vector difference) representing a displacement, the MVD being a difference between the actual MV and an MVP (motion vector prediction).

A quantization unit 210 maps transformed data to another number and, for example, may obtain a relatively small value by dividing the transformed data by a quantization step. A quantization parameter is a sequence number corresponding to a quantization step, and a corresponding quantization step may be found according to a quantization parameter. A small quantization parameter indicates that most details of a video frame are retained and a corresponding bit rate is high. A large quantization parameter indicates that a corresponding bit rate is low, but also indicates great distortion and low quality of an image. A principle of quantization is expressed by using the following formula: FQ=round(y/Qstep), where y is a value corresponding to a video frame before quantization, Qstep is a quantization step, and FQ is a quantized value obtained by quantizing y. The round(x) function may be used for performing rounding off to an even number on the quantized value, that is, Banker's rounding. A correspondence between a quantization parameter and a quantization step may be specifically set according to a specific application. For example, in some video coding standards, for luminance coding, the quantization step has a total of 52 values, which are integers from 0 to 51. For chroma coding, values of the quantization step are integers from 0 to 39. In addition, the quantization step increases as the quantization parameter increases. Each time the quantization parameter is increased by 6, the quantization step is doubled.

An entropy encoding unit 220 is configured to perform entropy encoding. The entropy encoding is a data encoding format according to an entropy principle without losing any information, and can represent specific information by using a relatively small character. An entropy encoding method may be, for example, Shannon coding or Huffman coding.

A first dequantization unit 212, a first inverse transformation unit 214, a first reconstruction unit 216, and a first reference information adaptation unit 218 are units corresponding to a reconstruction path. A reference frame is obtained through frame reconstruction by using the units of the reconstruction path, thereby maintaining consistency between reference frames in encoding and decoding. A step performed by the first dequantization unit 212 is an inverse process of quantization performed by the quantization unit 210. A step performed by the first inverse transformation unit 214 is an inverse process of transformation performed by the transformation unit 210. The first reconstruction unit 216 is configured to add up residual data obtained through the inverse transformation and predicted data to obtain a reconstructed reference frame. The first reference information adaptation unit 218 is configured to adapt, at the resolution of the to-be-encoded video frame, at least one piece of reference information such as the reference frame obtained through reconstruction, location information corresponding to each to-be-encoded block of the to-be-encoded video frame, location information of each reference block of the reference frame, and an MV, so that the first prediction unit 206 performs prediction according to the adapted reference information.

Figure 3:
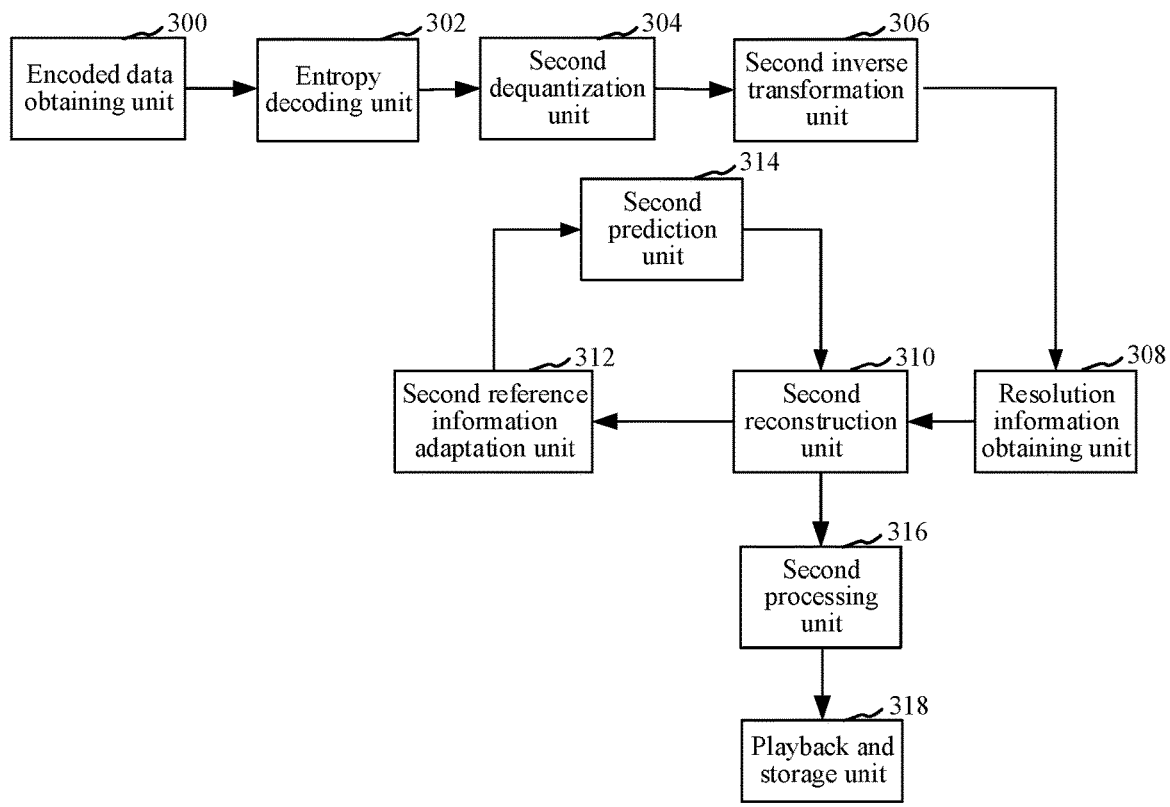
FIG. 3 is a decoding framework diagram corresponding to a video decoding method according to an embodiment of the present disclosure.

FIG. 3 is a decoding framework diagram corresponding to a video decoding method according to an embodiment. The video decoding method provided in one embodiment of the present disclosure may be as follows: An encoded data obtaining unit 300 obtains encoded data corresponding to each to-be-decoded video frame of a to-be-decoded video frame sequence. An entropy decoding unit 302 performs entropy decoding to obtain entropy decoded data. Then a second dequantization unit 304 dequantizes the entropy decoded data to obtain dequantized data. A second inverse transformation unit 306 inversely transforms the dequantized data to obtain inversely transformed data. The inversely transformed data may be consistent with data obtained after the first inverse transformation unit 214 in FIG. 2 performs inverse transformation.

A resolution information obtaining unit 308 is configured to obtain resolution information corresponding to the to-be-decoded video frame. A second reference information adaptation unit 312 is configured to obtain a reference frame that is obtained by a second reconstruction unit 310 through reconstruction, adapt at least one piece of reference information such as the reference frame, location information corresponding to each to-be-decoded block of the to-be-decoded video frame, location information corresponding to each reference block of the reference frame, and an MV according to the resolution information of the to-be-decoded video frame, and perform prediction according to the adapted information. A second prediction unit 314 obtains a reference block corresponding to the to-be-decoded block according to reference information obtained after the adaptation, and obtains, according to an image value of the reference block, a predicted pixel value consistent with the predicted pixel value in FIG. 2. The second reconstruction unit 310 performs reconstruction according to the predicted pixel value and the inversely transformed data (a pixel residual), to obtain a reconstructed video frame. A second processing unit 316 processes the reconstructed video frame according to the resolution information corresponding to the to-be-decoded video frame, to obtain a corresponding decoded video frame. A playback and storage unit 318 may play and/or store the decoded video frame.

It may be understood that, the encoding framework diagram and the decoding framework diagram are only examples, and do not constitute limitations on an encoding method and a decoding method to which solutions of the present disclosure are applied. A specific encoding framework diagram and decoding framework diagram may include more or fewer units than those shown in the figures, or some units may be combined, or a different unit deployment may be used. For example, in-loop filtering may be further performed on the reconstructed video frame, to reduce a blocking artifact of the video frame, and improve video quality.

Figure 4:
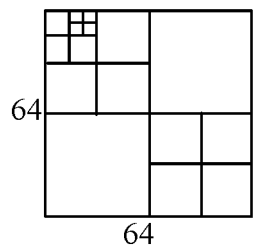
FIG. 4 is a schematic diagram of a to-be-encoded block according to an embodiment of the present disclosure.

The to-be-encoded video frame (i.e., the current frame) may be divided into a plurality of to-be-encoded blocks. A size of the to-be-encoded block may be set according to a specific application or obtained through calculation. For example, a size of each to-be-encoded block may be 8*8 pixels. Alternatively, rate distortion costs corresponding to different division manners of to-be-encoded blocks may be calculated, and a division manner at a small rate distortion cost is selected for division of to-be-encoded blocks. FIG. 4 is a schematic division diagram of a 64*64-pixel image block. A square block represents a to-be-encoded block (i.e., a block to be encoded). It can be learned from FIG. 4 that, a size of the to-be-encoded block may include 32*32 pixels, 16*16 pixels, 8*8 pixels, and 4*4 pixels. Certainly, the to-be-encoded block may alternatively have another size, which may be, for example, 32*16 pixels or 64*64 pixels. It may be understood that, during decoding, because a to-be-encoded block is in a one-to-one correspondence with a to-be-decoded block, a pixel size of the to-be-decoded block may also include 32*32 pixels, 16*16 pixels, 8*8 pixels, 4*4 pixels, and the like.

In a possible application scenario, the video encoding method and the video decoding method provided in the embodiments of the present disclosure may be applied to an application having a video call function. The application may be a social application or an instant messaging application. In a process of a video call between two terminals in which the application is installed, a first terminal acquires a video frame by using a camera, then encodes the video frame by using a video encoding function of the application to obtain encoded data, and sends the encoded data to a backend server of the application. The backend server forwards the encoded data to a second terminal. After receiving the encoded data, the second terminal immediately decodes the encoded data by using a video decoding function of the application, performs reconstruction to obtain a video frame, and displays the video frame. Similarly, the second terminal may send encoded data obtained through encoding to the first terminal by using the backend server, and the first terminal performs decoding and displaying. In this way, the video call between two parties is implemented.

In another possible application scenario, the video encoding method and the video decoding method provided in the embodiments of the present disclosure may be applied to an application having a video playback function. The application may be a live video streaming application, a short video application, or a video playback application. A terminal in which the application is installed may acquire a video frame by using a camera, then encodes the video frame by using a video encoding function of the application to obtain encoded data, and sends the encoded data to a backend server of the application. When another terminal requests the video, the backend server immediately sends the encoded data of the video to the another terminal. The application in the another terminal decodes the encoded data to play the video.

Certainly, the above-listed several possible application scenarios are only for schematic descriptions, the video encoding method and the video decoding method provided in the embodiments of the present disclosure may also be applied to other scenarios requiring video encoding and decoding, which is not limited in the embodiments of the present disclosure.

Figure 5:
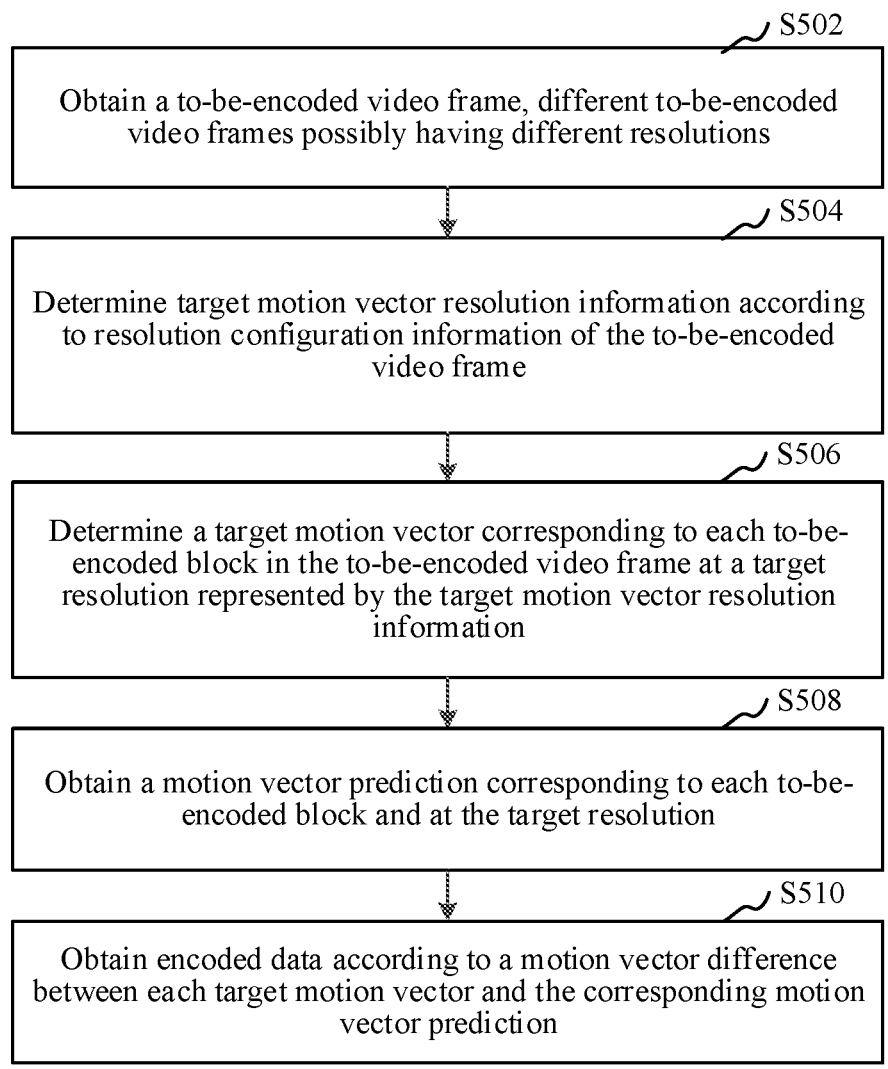
FIG. 5 is a flowchart of a video encoding method according to an embodiment of the present disclosure.

As shown in FIG. 5, in an embodiment, a video encoding method is provided. One embodiment is mainly described by using an example that the method is applied to a computer device. The computer device may be the terminal 110 or the server 120 in FIG. 1. Referring to FIG. 5, the video encoding method specifically includes the following steps:

S502. Obtain a to-be-encoded video frame, different to-be-encoded video frames possibly having different resolutions.

The to-be-encoded video frame is obtained by processing an input original video frame in a corresponding processing manner. The "different to-be-encoded video frames possibly having different resolutions" means that resolutions of different to-be-encoded video frames may be the same or may be different. For example, a video frame sequence includes an original video frame A and an original video frame B, and the original video frame A and the original video frame B may be processed in different processing manners. Therefore, resolutions of to-be-encoded video frames respectively corresponding to the original video frame A and the original video frame B may be different.

A video frame is a unit of a video. One video corresponds to one or more video frame sequences. One video frame sequence may include a plurality of original video frames. The original video frame may be a video frame acquired in real time, for example, may be a video frame obtained by a camera of the terminal in real time, or may be a video frame in a pre-stored video frame sequence. The original video frame may be an I frame, a P frame, or a B frame. The I frame is an intra-frame predicted frame. The P frame is a forward predictive frame. The B frame is a bidirectional predictive frame. To-be-encoded blocks of the P frame and the B frame may be encoded in an intra-frame prediction manner or an inter-frame prediction manner.

The to-be-encoded video frame may be directly an input original video frame. For example, processing in a full resolution processing manner is equivalent to directly using an original video frame as a to-be-encoded video frame. The full resolution processing manner means processing at a full resolution of an original video frame.

In an embodiment, when to-be-encoded video frames are directly input original video frames, if resolutions of the input original video frames are consistent, resolutions of different to-be-encoded video frames are the same. If resolutions of the input original video frames are different, resolutions of different to-be-encoded video frames are also different.

In an embodiment, when to-be-encoded video frames are video frames obtained by processing input original video frames in a processing manner, because the original video frames may be processed in different modes (for example, using different sampling ratios), to-be-encoded video frames obtained through the processing may have different resolutions. For example, an original video frame has a resolution of 800*800 pixels. In a processing manner of 1/2 down-sampling in horizontal and vertical directions, a to-be-encoded video frame obtained after the down-sampling has a resolution of 400*400 pixels. In a processing manner of 1/4 down-sampling in horizontal and vertical directions, a to-be-encoded video frame obtained after the down-sampling has a resolution of 200*200 pixels. Therefore, the resolutions of the to-be-encoded video frames obtained after the processing are different. The sampling ratio is a ratio obtained by dividing a resolution after sampling by a resolution before sampling. During down-sampling, the sampling ratio is less than 1. During up-sampling, the sampling ratio is greater than 1. When the sampling ratio is 1, a resolution is unchanged. It may be understood that, video encoding includes a cyclic process. After a to-be-encoded video frame is obtained and encoded, and encoded data of the to-be-encoded video frame is obtained, a new to-be-encoded video frame is further obtained and encoded, until all to-be-encoded video frames are encoded. When encoding to-be-encoded video frames, the computer device may encode a plurality of to-be-encoded video frames in parallel.

Similarly, encoding of a to-be-encoded video frame also includes a cyclic process. After a to-be-encoded block of the to-be-encoded video frame is encoded, a next to-be-encoded block is further encoded, until all to-be-encoded blocks of the to-be-encoded video frame are encoded. When encoding to-be-encoded blocks, the computer device may encode a plurality of to-be-encoded blocks in parallel.

S504. Determine target MV resolution information (e.g., a target MV resolution) according to resolution configuration information (e.g., a resolution configuration) of the to-be-encoded video frame.

The resolution information is data related to a resolution. The resolution information may be specifically the resolution, a sampling ratio, or the like. For example, the resolution information is: 400*400 (a resolution), 2 (an up-sampling ratio), or 1/2 (a down-sampling ratio). The MV resolution information is information related to a resolution corresponding to an MV.

The resolution configuration information is pre-configured information used for representing a resolution that needs to be used to process an MV. It may be understood that, the resolution configuration information may be directly configured resolution information that needs to be used to process an MV, or may be a configured resolution information determining manner. The resolution information determining manner is used for determining a type of resolution information that is used to process an MV, that is, used for determining which type of resolution information is used to process an MV. It may be understood that, the resolution information is different from the resolution information determining manner. For example, 400*400 is a resolution, and the resolution information determining manner may be an identifier used for representing a type of corresponding resolution information. For example, a resolution information determining manner 1 indicates that a determined type of resolution information is original resolution information, and a resolution information determining manner 2 indicates that a determined type of resolution information is current resolution information.

The type of resolution information that is used to process an MV may be the type of original resolution information or the type of current resolution information. It may be understood that, the original resolution information is resolution information of an original video frame. The current resolution information is resolution information of a current to-be-encoded video frame. It may be understood that, when the type of resolution information determined in the resolution information determining manner is the original resolution information, the original resolution information may be used as the target MV resolution information. When the type of resolution information determined in the resolution information determining manner is the current resolution information, current resolution information of the to-be-encoded video frame may be used as the target MV resolution information.

Because to-be-encoded video frames possibly have different resolutions, a current resolution is not a fixed resolution. When the type of resolution information determined in the resolution information determining manner is the current resolution information, target MV resolution information determined for different to-be-encoded video frames in corresponding resolution information determining manners may be different.

It may be understood that, an encoding side may agree with a decoding side on resolution configuration information in advance through configuration. In this way, during encoding or decoding, an MV may be transformed by default according to target MV resolution information corresponding to the configured resolution configuration information.

In an embodiment, resolution configuration information may be configured at a frame level (that is, at a video frame layer). Alternatively, resolution configuration information may be configured at a group of pictures (GOP) level (that is, at a GOP layer). Alternatively, resolution configuration information may be configured at a sequence level (that is, at a video frame sequence layer). For example, assuming that resolution configuration information is configured at a GOP level, for to-be-encoded video frames corresponding to original video frames in a GOP, resolution configuration information corresponding to the to-be-encoded video frames is resolution configuration information correspondingly configured for the GOP.

It may be understood that, the resolution configuration information corresponds to the target MV resolution information. The target MV resolution information may be original resolution information of an original video frame, or may be current resolution information of a to-be-encoded video frame. The original resolution information is data related to an original resolution of an original video frame. The current resolution information is data related to a current resolution of a to-be-encoded video frame, and is used for representing the current resolution of the to-be-encoded video frame. Therefore, the computer device may configure resolution configuration information used for instructing to use the original resolution information to process an MV, or may configure resolution configuration information used for instructing to use the current resolution information to process an MV.

S506. Determine a target MV corresponding to each to-be-encoded block in the to-be-encoded video frame at a target resolution represented by the target MV resolution information.

An MV is a displacement of a to-be-encoded block relative to a reference block of the to-be-encoded block during video encoding. The reference block of the to-be-encoded block is data to which reference needs to be made when the to-be-encoded block is encoded. The MV is used for searching for a reference block of a to-be-decoded block when the to-be-decoded block is decoded, to reconstruct the to-be-decoded block. The target MV is an MV at the target resolution.

A resolution corresponding to an MV is a resolution corresponding to a unit of the MV. For example, for a to-be-encoded block, when a resolution corresponding to an MV of the to-be-encoded block is a resolution of a to-be-encoded video frame, a unit 1 of the MV indicates a displacement of n pixels (n is ¼ in an H.264 framework) from the to-be-encoded block at the resolution of the to-be-encoded video frame. The target MV resolution information is MV resolution information used as a target. A resolution represented by the target MV resolution information is the target resolution.

In an embodiment, a reference frame in which a reference block of each to-be-encoded block in the to-be-encoded video frame is located varies with a prediction type. The to-be-encoded video frame may be an I frame, a P frame, or a B frame. The I frame is an intra-frame predicted frame. The P frame is a forward predictive frame. The B frame is a bidirectional predictive frame. Therefore, the reference frame in which the reference block of each to-be-encoded block is located may be the current video frame, a forward reference frame, a backward reference frame, or a bidirectional reference frame. There may be one or more reference frames. The reference frame is a video frame to which reference needs to be made when the to-be-encoded video frame is encoded. A person skilled in the art may understand that, the reference frame is a video frame obtained through reconstruction according to encoded data obtained through encoding before the to-be-encoded video frame is encoded.

For a to-be-encoded block in a to-be-encoded video frame, after a reference block of the to-be-encoded block is found in a reference frame, a target MV may be directly calculated at the target resolution represented by the target MV resolution information corresponding to the resolution configuration information, or an MV of the to-be-encoded block may be calculated at a current resolution of the to-be-encoded video frame. If the MV of the to-be-encoded block is calculated at the current resolution of the to-be-encoded video frame, the computer device may compare the target resolution represented by the target MV resolution information with the resolution of the to-be-encoded video frame. When the two are consistent, the MV at the resolution of the to-be-encoded video frame is the target MV at the target resolution. When the two are inconsistent, the computer device transforms the MV at the resolution of the to-be-encoded video frame to the target MV at the target resolution.

For example, the target resolution is 800*800, and the resolution of the to-be-encoded video frame is 400*400. Assuming that the MV at the resolution of the to-be-encoded video frame is A(2, 2), a unit 1 of the MV indicates a displacement of n pixels of the to-be-encoded block at the resolution of the to-be-encoded video frame. It may be understood that, if a displacement of n pixels is present at the resolution 400*400, a displacement of 2n pixels is present at the resolution 800*800. Therefore, corresponding to A(2, 2), the MV at the target resolution is B(4, 4).

It may be understood that, after determining the target MV corresponding to each to-be-encoded block in the to-be-encoded video frame, the computer device may obtain encoded data corresponding to each to-be-encoded block according to the target MV corresponding to each to-be-encoded block in the to-be-encoded video frame. Steps S508 and S510 are an embodiment of obtaining encoded data corresponding to each to-be-encoded block according to the target MV corresponding to each to-be-encoded block in the to-be-encoded video frame.

S508. Obtain an MVP corresponding to each to-be-encoded block and at the target resolution.

The MVP is a predicted MV. It may be understood that, when the to-be-encoded video frame is encoded, a data amount is relatively large if the MV of each to-be-encoded block in the to-be-encoded video frame is directly encoded. To reduce the data amount (bits) of the encoded data, the MV of each to-be-encoded block in the to-be-encoded video frame may be predicted, to obtain the MVP of each to-be-encoded block, to directly encode a difference between the MV and the MVP of each to-be-encoded block.

A calculation manner of the MVP is not limited in one embodiment of the present disclosure. The computer device may obtain the MVP of the to-be-encoded block using an MV of an encoded block. For example, an average value of MVs corresponding to a plurality of encoded blocks adjacent to a current to-be-encoded block may be used as an MVP of the current to-be-encoded block. Alternatively, an MV of an image block in a reference frame and corresponding to a current to-be-encoded block with respect to an image location may be used as an MVP of the current to-be-encoded block.

It may be understood that the MV of the encoded block is also obtained by performing step S506, and a resolution corresponding to the MV of the encoded block is the target resolution represented by the target MV resolution information. Because the MVP is obtained through calculation by using the MV of the encoded block, a resolution corresponding to the MVP is also the target resolution represented by the target MV resolution information.

In this way, for a to-be-encoded GOP or a to-be-encoded video frame, during encoding, a target MV and an MVP of each to-be-encoded block correspond to the same resolution. In this case, during calculation on the target MV and the MVP, a calculation result corresponding to each to-be-encoded block also corresponds to the same resolution. When an encoder of the computer device encodes the calculation result corresponding to each to-be-encoded block, encoding quality will not be affected by frequent needs to adjust a parameter of the encoder due to different resolutions of calculation results corresponding to different to-be-encoded blocks, and encoding efficiency can be improved.

It may be understood that, the parameter of the encoder needs to be adjusted when the encoder encodes data at different resolutions. In one embodiment of the present disclosure, different to-be-encoded video frames possibly have different resolutions, and for different to-be-encoded blocks of the same to-be-encoded video frame, data used for encoding also possibly have different resolutions. Therefore, when a GOP or a video frame is encoded, a piece of target MV resolution information may be specified by using resolution configuration information, so that all data used for encoding corresponds to a target resolution represented by the target MV resolution information, which can ensure encoding quality, and improve encoding efficiency.

S510. Obtain encoded data according to an MVD between each target MV and the corresponding MVP.

It may be understood that, the encoded data is encoded data corresponding to the to-be-encoded video frame.

The MVD is a difference between an MV and an MVP. Specifically, for each to-be-encoded block in a current to-be-encoded video frame, the computer device may calculate an MVD according to a target MV and an MVP of each to-be-encoded block, and then encode the MVD of each to-be-encoded block to obtain encoded data. An encoding process herein may include at least one of transformation, quantization, and entropy encoding.

It may be understood that, the encoded data is data obtained by encoding the to-be-encoded video frame. The encoded data is not limited to being obtained by encoding the MVD. Data to be encoded to obtain encoded data may further include a pixel residual. The pixel residual is a difference between an actual pixel value and a predicted pixel value of a to-be-encoded block. The predicted pixel value is obtained through prediction according to an actual pixel value of a reference block of the to-be-encoded block.

In the foregoing video encoding method, when a to-be-encoded video frame having different resolutions is encoded, a target MV and an MVP corresponding to each to-be-encoded block in the to-be-encoded video frame are determined at a target resolution represented by target MV resolution information determined according to resolution configuration information. In this way, encoded data obtained according to an MVD between the target MV and the corresponding MVP at the same resolution is more accurate, thereby improving encoding quality. Moreover, obtaining the encoded data according to the MVD between the target MV and the corresponding MVP at the same resolution reduces a data amount of the encoded data. In addition, the video encoding method can be used to encode to-be-encoded video frames with different resolutions, which improves encoding flexibility.

In an embodiment, the computer device may alternatively not pre-configure the resolution configuration information corresponding to a to-be-encoded video frame, but may preset one or more pieces of MV resolution information, select target MV resolution information from the preset MV resolution information, and then determine a target MV corresponding to each to-be-encoded block in the to-be-encoded video frame at a target resolution represented by the selected target MV resolution information. That is, steps S504 and S506 may be replaced with the step of "determining a target MV corresponding to each to-be-encoded block in the to-be-encoded video frame at a target resolution represented by the selected target MV resolution information". The computer device may continue to perform the steps of obtaining an MVP corresponding to each to-be-encoded block and at the target resolution; and obtaining encoded data corresponding to the to-be-encoded video frame according to an MVD between each target MV and the corresponding MVP. The encoded data includes identification information representing the target resolution. It may be understood that, the identification information may tell the decoding side the target resolution used during encoding at the encoding side.

In an embodiment, step S502 includes: obtaining the original video frame; obtaining a processing manner corresponding to the original video frame; and processing the original video frame in the processing manner, to obtain the to-be-encoded video frame, the processing manner being a full resolution processing manner or a down-sampling processing manner.

The processing manner corresponding to the original video frame is selected from a candidate processing manner. The candidate processing manner includes at least one of the full resolution processing manner and the down-sampling processing manner.

It may be understood that, when the processing manner is the full resolution processing manner, the original video frame may be directly used as the to-be-encoded video frame. When the processing manner is the down-sampling processing manner, the original video frame may be down-sampled to obtain the to-be-encoded video frame. A resolution of the to-be-encoded video frame obtained in the down-sampling processing manner is less than a resolution of the original video frame. For example, when an original video frame has a resolution of 800*800 pixels, in a processing manner of 1/2 down-sampling in horizontal and vertical directions, a to-be-encoded video frame obtained after the down-sampling has a resolution of 400*400 pixels.

It may be understood that, a method for obtaining a processing manner corresponding to an original video frame may be set according to an actual need. For example, a processing parameter corresponding to the original video frame may be obtained, and a corresponding processing manner is obtained according to the processing parameter. The processing parameter is a parameter used for determining a processing manner, and a specific used processing manner may be set according to an actual need. In an embodiment, the processing parameter may include at least one of current encoding information and image feature information corresponding to an input original video frame.

In an embodiment, when the processing manner corresponding to the original video frame is the down-sampling processing manner, a down-sampling ratio and a down-sampling method may be further obtained. The sampling ratio is a ratio obtained by dividing a resolution after sampling by a resolution before sampling. The down-sampling method may be direct average, filtering, bicubic interpolation, bilinear interpolation, or the like. The down-sampling ratio may be preset, or may be flexibly adjusted. For example, all down-sampling ratios may be set to 1/2.

Alternatively, for an input video frame sequence, a down-sampling ratio of the first original video frame is 1/2, and a down-sampling ratio of the second original video frame is 1/4. The down-sampling ratio may be obtained according to an encoding location of an original video frame in a GOP. An encoding location closer to the end indicates a smaller down-sampling ratio. A down-sampling direction may be one of vertical down-sampling, horizontal down-sampling, and a combination of vertical and horizontal down-sampling. If a resolution of a video frame before sampling is 800*800 pixels, after horizontal down-sampling with a down-sampling ratio of 1/2, a resolution of an obtained video frame is 400*800 pixels. After vertical down-sampling with a down-sampling ratio of 1/2, a resolution of an obtained video frame is 800*400 pixels.

In an implementation, the down-sampling ratio may be obtained according to a capability of a processor of a device, such as a terminal or a server, performing the video encoding method. A device with a processor having a strong processing capability corresponds to a large down-sampling ratio, and a device with a processor having a weak processing capability corresponds to a small down-sampling ratio. A correspondence between a processing capability of a processor and a down-sampling ratio may be set. When encoding is needed, a processing capability of a processor is obtained, and a corresponding down-sampling ratio is obtained according to the processing capability of the processor. For example, a 16-bit processor may be set to correspond to a down-sampling ratio of 1/8, and a 32-bit processor may be set to correspond to a down-sampling ratio of 1/4.

In an embodiment, the down-sampling ratio may be obtained according to a frequency or times of usage of an original video frame as a reference frame. A correspondence between a down-sampling ratio and a frequency or times of usage of an original video frame as a reference frame may be set. A higher frequency or more times of usage of an original video frame as a reference frame indicates a larger down-sampling ratio. A lower frequency or less times of usage of an original video frame as a reference frame indicates a smaller down-sampling ratio. For example, an I frame has a high frequency of being used as a reference frame, and therefore corresponds to a large down-sampling ratio, which may be 1/2. A P frame has a low frequency of being used as a reference frame, and therefore corresponds to a small down-sampling ratio, which may be, for example, 1/4. As the down-sampling ratio is obtained according to the frequency or times of usage of an original video frame as a reference frame, in a case of a high frequency or many times of usage of an original video frame as a reference frame, image quality is relatively good, which can improve prediction accuracy, reduce a pixel residual, and improve quality of an encoded image.

In an embodiment, the down-sampling method may be obtained according to a capability of a processor of a device, such as a terminal or a server, performing the video encoding method. A device with a processor having a strong processing capability corresponds to a down-sampling method of high complexity, and a device with a processor having a weak processing capability corresponds to a down-sampling method of low complexity. A correspondence between a processing capability of a processor and a down-sampling method may be set. When encoding is needed, a processing capability of a processor is obtained, a corresponding down-sampling method is obtained according to the processing capability of the processor. For example, bicubic interpolation has higher complexity than bilinear Interpolation, and therefore, a 16-bit processor may be set to correspond to the down-sampling method of bilinear Interpolation, and a 32-bit processor may be set to correspond to the down-sampling method of bicubic interpolation.

In one embodiment of the present disclosure, when original video frames are processed in the down-sampling processing manner, down-sampling may be further performed according to different down-sampling methods or down-sampling ratios, to perform more flexible processing on the original video frames.

In an embodiment, a processing manner corresponding to an original video frame may be obtained according to at least one of current encoding information and image feature information corresponding to the original video frame. The current encoding information refers to video compression parameter information, for example, one or more of a frame type, an MV, a quantization parameter, a video source, a bit rate, a frame rate, and a resolution, which is obtained during encoding. The image feature information refers to information related to image content, which includes one or more of image motion information and image texture information, for example, an edge. The current encoding information and the image feature information reflect a scenario, detail complexity, motion intensity, or the like corresponding to the video frame. For example, a motion scenario may be determined by using one or more of the MV, the quantization parameter, and the bit rate. A large quantization parameter usually indicates high motion intensity, and a large MV indicates that an image scenario is a large motion scenario.

The determining may alternatively be performed according to a ratio of a bit rate of an encoded I frame to that of an encoded P frame or a ratio of the bit rate of the encoded I frame to that of an encoded B frame. If the ratio exceeds a first preset threshold, it is determined that an image is a still image. If the ratio is less than a second preset threshold, it may be determined that an image is an image with high motion intensity. Alternatively, a target object is directly tracked according to image content, and whether a scenario is a large motion scenario is determined according to a motion speed of the target object. A specific bit rate can indicate a specific amount of information. For a scenario with high motion intensity, an amount of information in a time domain is large, and accordingly, a bit rate that can be used to express information in a space domain is small. Therefore, a relatively good image quality effect can be achieved by using a low resolution, and the down-sampling processing manner is preferred for encoding.

A picture switching scenario may be determined according to a frame prediction type, and a preferred processing manner may also be determined according to impact of the frame prediction type on other frames. For example, an I frame is usually the start frame or is subject to picture switching, and quality of the I frame affects quality of a subsequent P frame or B frame. Therefore, an intra-frame predicted frame prefers the full resolution processing manner more than an inter-frame predicted frame, to ensure image quality. The P frame may be used as a reference frame of the B frame, and image quality of the P frame affects image quality of the subsequent B frame. Therefore, encoding with the P frame prefers the full resolution processing manner more than encoding with the B frame. Texture complexity of a to-be-encoded video frame is determined according to the image feature information, for example, image texture information. If an image has a complex texture and includes many details, the image has a large amount of information in a space domain. If down-sampling is performed, a relatively large amount of detail information may be lost due to the down-sampling, thus affecting video quality. Therefore, a to-be-encoded video frame having a complex texture prefers the full resolution processing manner more than a to-be-encoded video frame having a simple texture.

In an embodiment, the processing manner corresponding to the original video frame may be obtained according to a relationship between a current quantization parameter corresponding to the original video frame and a quantization parameter threshold. If the current quantization parameter is greater than the quantization parameter threshold, it is determined that the processing manner is the down-sampling processing manner. Otherwise, it is determined that the processing manner is the full resolution processing manner. The quantization parameter threshold may be obtained according to a proportion of an intra-frame predicted block in a forward coded video frame encoded before the original video frame. A correspondence between a proportion of an intra-frame predicted block and a quantization parameter threshold may be preset. In this way, after a proportion of an intra-frame predicted block in a current frame is determined, a quantization parameter threshold corresponding to the proportion of the intra-frame predicted block in the current frame may be determined according to the correspondence. For encoding with a fixed quantization parameter, a current quantization parameter may have a corresponding fixed quantization parameter value. For encoding with a fixed bit rate, a current quantization parameter corresponding to an original video frame may be obtained through calculation according to a bit rate control model. Alternatively, a quantization parameter corresponding to a reference frame may be used as the current quantization parameter corresponding to the original video frame. In one embodiment of the present disclosure, a large current quantization parameter usually indicates higher motion intensity, and the down-sampling processing manner is preferred in a scenario with high motion intensity.

In an implementation, a relationship between a proportion of an intra-frame predicted block and a quantization parameter threshold is a positive correlation relationship. For example, a correspondence between a proportion $Intra_0$ of an intra-frame predicted block and a quantization parameter threshold $QP_{TH}$ may be pre-determined according to experience:

$$QP_{TH} = \begin{cases} 33, & Intra_0 < 10\% \\ 31, & 10\% \leq Intra_0 < 50\% \\ 29, & Intra_0 \geq 50\% \end{cases}.$$

In the foregoing embodiment, after a processing manner corresponding to an original video frame is obtained, the original video frame may be processed in the processing manner, to obtain a to-be-encoded video frame. As a video frame processing manner is flexibly selected to process the original video frame, a resolution of the original video frame is reduced to reduce a data amount of to-be-encoded data.

In an embodiment, the method further includes: adding processing manner information corresponding to the processing manner to encoded data corresponding to the original video frame.

Specifically, the processing manner information is used for describing the processing manner used for the original video frame, and a flag Frame_Resolution_Flag for describing a processing manner may be added to the encoded data. A value of a flag corresponding to each processing manner may be set according to a specific application. For example, when the processing manner is the full resolution processing manner, corresponding Frame_Resolution_Flag may be 0. When the processing manner is the down-sampling processing manner, corresponding Frame_Resolution_Flag may be 1. In an embodiment, the processing manner information is added to frame-level header information corresponding to the encoded data, for example, may be added to a preset location in the frame-level header information. Frame-level header information is header information of encoded data corresponding to an original video frame. Sequence-level header information is header information of encoded data corresponding to a video frame sequence. GOP-level header information is header information of encoded data corresponding to a GOP. One video frame sequence may include a plurality of GOPs. One GOP may include a plurality of original video frames.

FIG. 6 is a structural block diagram of a video frame sequence according to an embodiment. In FIG. 6, blocks represented by dashed lines represent frame-level header information of encoded data corresponding to original video frames, and "Frame" represents encoded data corresponding to the first, second, . . . , and $n^{th}$ original video frames respectively. It can be learned from FIG. 6 that, processing manners corresponding to the first original video frame and the second original video frame are the full resolution processing manner, and a processing manner corresponding to the $n^{th}$ original video frame is the down-sampling processing manner.

In an embodiment, down-sampling processing manner information for down-sampling the original video frame may be further added to the encoded data corresponding to the original video frame, so that when obtaining the encoded data, the decoding side can obtain a corresponding up-sampling method and up-sampling ratio for up-sampling a reconstructed video frame according to the down-sampling processing manner information. The down-sampling processing manner information includes at least one of down-sampling method information and down-sampling ratio information. A location where the down-sampling method information is added to the encoded data may be one of corresponding GOP-level header information, sequence-level header information, and frame-level header information, which may be determined according to an action range corresponding to a down-sampling method. A location where the down-sampling ratio information is added to the encoded data may be any one of the corresponding GOP-level header information, sequence-level header information, and frame-level header information, which may be determined according to an action range corresponding to a down-sampling ratio. The action range is a range to which it is applied. For example, if an action range of a down-sampling ratio is a GOP, down-sampling ratio information corresponding to the GOP may be added to header information corresponding to the GOP. If an action range of a down-sampling ratio is a video frame sequence, down-sampling ratio information is added to sequence-level header information corresponding to the video frame sequence, to indicate that each video frame of the video frame sequence is down-sampled by using the down-sampling ratio corresponding to the down-sampling ratio information.

In an embodiment, step S506 of determining a target MV corresponding to each to-be-encoded block in the to-be-encoded video frame at a target resolution represented by the target MV resolution information includes: determining an initial MV corresponding to each to-be-encoded block in the to-be-encoded video frame at a current resolution of the to-be-encoded video frame; and transforming the initial MV to the target MV at the target resolution in a case that the current resolution is inconsistent with the target resolution represented by the target MV resolution information.

An initial MV of a to-be-encoded block is an MV at a current resolution of a to-be-encoded video frame in which the to-be-encoded block is located.

It may be understood that, for a to-be-encoded block in a to-be-encoded video frame, after a reference block of the to-be-encoded block is found in a reference frame, a target MV may be directly calculated at the target resolution represented by the selected target MV resolution information, or an MV of the to-be-encoded block may be calculated at a current resolution of the to-be-encoded video frame. If the MV of the to-be-encoded block is calculated at the current resolution of the to-be-encoded video frame, a resolution corresponding to a unit of the MV obtained through the calculation is the current resolution of the to-be-encoded video frame. In this case, the MV obtained through the calculation is an initial MV.

The computer device may compare the target resolution represented by the target MV resolution information with the current resolution of the to-be-encoded video frame. When the two resolutions are consistent, the resolution corresponding to the unit of the initial MV is the target resolution, and the initial MV does not need to be transformed.

In an embodiment, the target resolution represented by the target MV resolution information is an original resolution of an original video frame corresponding to the to-be-encoded video frame; and the transforming the initial MV to the target MV at the target resolution in a case that the current resolution is inconsistent with the target resolution represented by the target MV resolution information includes: transforming the initial MV corresponding to each to-be-encoded block of the to-be-encoded video frame to the target MV at the original resolution in a case that the to-be-encoded video frame is obtained by processing the original video frame in the down-sampling processing manner.

It may be understood that, the current resolution of the to-be-encoded video frame obtained by processing the original video frame in the down-sampling processing manner is less than the original resolution of the original video frame (in other words, the two are inconsistent). Therefore, when the target resolution is the original resolution, an initial MV of the to-be-encoded video frame needs to be transformed. That is, the initial MV corresponding to each to-be-encoded block of the to-be-encoded video frame is transformed to the target MV at the original resolution.

In an embodiment, the transforming the initial MV to the target MV at the target resolution in a case that the current resolution is inconsistent with the target resolution includes: determining a first vector transformation coefficient according to current resolution information of the to-be-encoded video frame and the target MV resolution information; and transforming the initial MV to the target MV at the target resolution according to the first vector transformation coefficient.

The vector transformation coefficient is used for transforming an MV. After the initial MV is obtained, the initial MV may be multiplied by the first vector transformation coefficient, to obtain a product as the target MV.

It may be understood that, the vector transformation coefficient may be represented in a form of a scale (that is, the vector transformation coefficient may be a scale), or may be represented in a form of a number (that is, the vector transformation coefficient may be a number). When the vector transformation coefficient is represented in a form of a scale, the computer device may transform an MV from one resolution space to another resolution space according to the scale. For example, the initial MV at the current resolution (that is, in a current resolution space) is transformed to the target MV at the target resolution (that is, in a target resolution space) according to the scale.

Because resolution information may be data of a resolution or sampling ratio type, the first vector transformation coefficient may be specifically a ratio of the target MV resolution information to the current resolution information of the to-be-encoded video frame, which are of the same type. It may be understood that, the same type means that a type of the target MV resolution information is the same as a type of the current resolution information of the to-be-encoded video frame. For example, if both of the two are resolutions, they belong to the same type. If one of the two is a resolution while the other is a down-sampling ratio, they do not belong to the same type.

For example, if the target MV resolution information is a down-sampling ratio and is specifically 1/3, and the current resolution information of the to-be-encoded video frame is a down-sampling ratio and is specifically 1/6, the first vector transformation coefficient may be 2 obtained by dividing 1/3 by 1/6. For another example, if the target MV resolution information is a resolution and is specifically 800*800, and the current resolution information of the to-be-encoded video frame is a resolution and is specifically 400*400, the first vector transformation coefficient may be 2 obtained by dividing 800 by 400. When the vector transformation coefficient is 2, assuming that the MV at the current resolution of the to-be-encoded video frame is A(2, 2), an MV corresponding to A(2, 2) and at the target resolution is B(2*2, 2*2), that is, (4, 4).

In an embodiment, the first vector transformation coefficient may include two parts: a vector transformation coefficient in a horizontal direction and a vector transformation coefficient in a vertical direction. For example, if the target MV resolution information is a resolution and is specifically 900*900, and the current resolution information of the to-be-encoded video frame is a resolution and is specifically 450*600, the vector transformation coefficient in the horizontal direction is 900/450=2, and the vector transformation coefficient in the vertical direction is 900/600=1.5.

In the foregoing embodiment, when the target resolution represented by the target MV resolution information is inconsistent with the current resolution of the to-be-encoded video frame, the initial MV at the current resolution is adjusted to the target resolution for resolution consistency with another parameter, that is, the MVP, for calculating the MVD during subsequent MVD calculation, to ensure accuracy of the MVD and control a data amount of the MVD.

In an embodiment, S508 of obtaining an MVP corresponding to each to-be-encoded block and at the target resolution includes: determining, for a current to-be-encoded block in a process of encoding each to-be-encoded block in the to-be-encoded video frame, a reference frame in which a reference block corresponding to the current to-be-encoded block is located; determining, in the reference frame, an image block corresponding to the current to-be-encoded block with respect to an image location; and obtaining a target MV corresponding to the image block and at the target resolution as an MVP of the current to-be-encoded block.

A reference frame is a video frame to which reference needs to be made when a to-be-encoded video frame is encoded. It may be understood that, the reference frame is a video frame obtained through reconstruction according to encoded data obtained through encoding before the to-be-encoded video frame is encoded. A to-be-encoded video frame may have one or more reference frames.

Specifically, after selecting a reference frame of the to-be-encoded video frame according to a preset reference frame selection policy, when encoding each to-be-encoded block in the to-be-encoded video frame with reference to the reference frame, for a current to-be-encoded block, the computer device may search the reference frame for a reference block that matches the current to-be-encoded block. After the reference block that matches the current to-be-encoded block is found, a reference frame in which the reference block is located is further determined.

Further, the computer device may determine, in the determined reference frame, an image block corresponding to the current to-be-encoded block with respect to an image location, and obtain a target MV corresponding to the image block and at the target resolution as an MVP of the current to-be-encoded block. The corresponding with respect to an image location may be specifically corresponding with respect to an image pixel or corresponding with respect to image coordinates.

FIG. 7 is a schematic principle diagram of selecting an MVP according to an embodiment. Referring to FIG. 7, the schematic diagram shows a to-be-encoded video frame 710, a current to-be-encoded block 711 in the to-be-encoded video frame 710, a reference frame 720, and an image block 721 in the reference frame 720 and corresponding to the current to-be-encoded block 711 with respect to an image location. An MV of the image block 721 may be used as an MVP of the current to-be-encoded block 711.

It may be understood that, because the reference frame is a video frame obtained through reconstruction according to encoded data obtained through encoding before the to-be-encoded video frame is encoded, if the encoded data for reconstructing the reference frame includes an MV, that is, a target MV, corresponding to the image block and at the target resolution, the target MV may be directly obtained as the MVP of the current to-be-encoded block. If the encoded data for reconstructing the reference frame does not include an MV corresponding to the image block and at the target resolution, an MV corresponding to the image block in the data for reconstructing the reference frame is transformed to a target MV at the target resolution.

In an embodiment, whether the encoded data for reconstructing the reference frame includes an MV corresponding to the image block of the reference frame and at the target resolution is related to target MV resolution information selected during encoding performed to obtain the encoded data for reconstructing the reference frame. When the target MV resolution information selected during encoding performed to obtain the encoded data for reconstructing the reference frame and current selected target MV resolution information both represent the same target resolution, the encoded data for reconstructing the reference frame includes an MV corresponding to the image block of the reference frame and at the target resolution. When the target MV resolution information selected during encoding performed to obtain the encoded data for reconstructing the reference frame and current selected target MV resolution information represent different target resolutions, the encoded data for reconstructing the reference frame does not include an MV corresponding to the image block of the reference frame and at the target resolution.

In an embodiment, the target resolution represented by the target MV resolution information is a current resolution of the to-be-encoded video frame; and the obtaining a target MV corresponding to the image block and at the target resolution as an MVP of the current to-be-encoded block includes: obtaining an initial MV of the image block at a resolution of the reference frame; and transforming the initial MV of the image block to a target MV at the current resolution as the MVP of the current to-be-encoded block in a case that the resolution of the reference frame is inconsistent with the current resolution.

It may be understood that, because the reference frame is a video frame obtained through reconstruction according to encoded data obtained through encoding before the to-be-encoded video frame is encoded, the encoding performed to obtain the encoded data for reconstructing the reference frame also includes steps S504 to S510. Therefore, when a to-be-encoded video frame is previously encoded to obtain the encoded data for reconstructing the reference frame, target MV resolution information is also determined according to resolution configuration information of the to-be-encoded video frame.

In an embodiment, the transforming the initial MV of the image block to a target MV at the current resolution as the MVP of the current to-be-encoded block includes: determining a second vector transformation coefficient according to resolution information of the reference frame and the target MV resolution information; and transforming the initial MV of the image block to the target MV at the current resolution according to the second vector transformation coefficient.

In an embodiment, the second vector transformation coefficient may be a ratio of the resolution information of the reference frame to the target MV resolution information. The resolution information of the reference frame is used for representing a resolution of the reference frame.

The computer device may transform, according to the second vector transformation coefficient, the initial MV of the image block to the target MV at the current resolution as the MVP of the current to-be-encoded block, and use the target MV obtained after the transformation as the MVP of the current to-be-encoded block.

Further, when the MV of the image block in the reference frame is used as the MVP of the to-be-encoded block of the current to-be-encoded video frame, the MVP of the to-be-encoded block is flexibly adjusted to the same resolution as the MV of the to-be-encoded block according to the resolution of the reference frame and the target resolution selected for the current to-be-encoded video frame, to improve encoding quality and control an amount of the encoded data.

In an embodiment, the obtaining a processing manner corresponding to the original video frame includes: obtaining a processing parameter corresponding to the original video frame, and determining a processing manner corresponding to the original video frame according to the processing parameter; and the adding processing manner information corresponding to the processing manner to encoded data corresponding to the original video frame includes: adding the processing manner information corresponding to the processing manner to the encoded data corresponding to the original video frame when the processing parameter cannot be reproduced in a decoding process.

Specifically, the processing parameter may include at least one of image encoding information and image feature information corresponding to the original video frame. That the processing parameter cannot be reproduced in a decoding process means that the processing parameter cannot be obtained or generated in a decoding process. For example, if the processing parameter is information corresponding to image content of the original video frame, because image information may be lost in the encoding process, a to-be-decoded video frame at the decoding side is different from the original video frame. Therefore, the information corresponding to the image content of the original video frame is not obtained in the decoding process. That is, the information corresponding to the image content cannot be reproduced in the decoding process. For a rate distortion cost that needs to be calculated in the encoding process and is not calculated in the decoding process, when the processing parameter includes the rate distortion cost, the processing parameter cannot be reproduced in the decoding process. Peak signal to noise ratio (PSNR) information of a reconstructed video frame obtained in the encoding process and the original video frame cannot be obtained in the decoding process, which therefore, cannot be reproduced in the decoding process.

In an embodiment, when the processing parameter can be reproduced at the decoding side, the processing manner information corresponding to the processing manner may or may not be added to the encoded data corresponding to the original video frame. When the processing manner information corresponding to the processing manner is added to the encoded data corresponding to the original video frame, the decoding side may read the processing manner information from the encoded data without obtaining a processing manner according to the processing parameter. When the processing manner information corresponding to the processing manner is not added to the encoded data corresponding to the original video frame, the decoding device determines, according to the processing parameter, a processing manner consistent with that at the encoding side, which can reduce a data amount of the encoded data.

It may be understood that, after obtaining the to-be-encoded video frame, the computer device may encode the to-be-encoded video frame at the resolution of the to-be-encoded video frame to obtain the encoded data corresponding to the original video frame. Steps S502 to S508 include the step of encoding the to-be-encoded video frame at the resolution of the to-be-encoded video frame to obtain the encoded data corresponding to the original video frame.

In an embodiment, the step of encoding the to-be-encoded video frame at the resolution of the to-be-encoded video frame to obtain the encoded data corresponding to the original video frame further includes: obtaining a reference frame corresponding to the to-be-encoded video frame; and encoding the to-be-encoded video frame at the resolution of the to-be-encoded video frame according to the reference frame, to obtain the encoded data corresponding to the original video frame.

The reference frame is a video frame to which reference needs to be made when the to-be-encoded video frame is encoded. It may be understood that, the reference frame is a video frame obtained through reconstruction according to data obtained through encoding before the to-be-encoded video frame is encoded. The to-be-encoded video frame may correspond to one or more reference frames. For example, the to-be-encoded video frame is a P frame, and corresponds to one reference frame. The to-be-encoded video frame is a B frame, and corresponds to two reference frames. The reference frame corresponding to the to-be-encoded video frame may be obtained according to a reference relationship, which is determined according to video codec standards. For example, for the second video frame in a GOP, which is a B frame, a corresponding reference frame may be an I frame in the GOP and a video frame that is obtained through decoding and reconstruction after the fourth frame in the GOP is encoded.

In an embodiment, the obtaining a reference frame corresponding to the to-be-encoded video frame includes: obtaining a first reference rule, the first reference rule including a resolution relationship between the to-be-encoded video frame and the reference frame; and obtaining the reference frame corresponding to the to-be-encoded video frame according to first reference rule.

Specifically, the first reference rule defines the resolution relationship between the to-be-encoded video frame and the reference frame, the resolution relationship including resolutions of the to-be-encoded video frame and the reference frame being the same or being different. When the first reference rule includes the resolutions of the to-be-encoded video frame and the reference frame being the same, the first reference rule may further include a processing manner reference rule for the resolutions of the to-be-encoded video frame and the reference frame. The processing manner reference rule may include one or both of reference being made to a reference frame in the full resolution processing manner for a to-be-encoded video frame in the full resolution processing manner, and reference being made to a reference frame in the down-sampling processing manner for a to-be-encoded video frame in the down-sampling processing manner. When the first reference rule includes the resolutions of the to-be-encoded video frame and the reference frame being different, the first reference rule may further include the resolution of the to-be-encoded video frame being greater than the resolution of the reference frame, or the resolution of the to-be-encoded video frame being less than the resolution of the reference frame.

In an embodiment, the first reference rule may specifically include one or more of the following: reference may be made to a reference frame at a down-sampling resolution for a to-be-encoded video frame at an original resolution, reference may be made to a reference frame at an original resolution for a to-be-encoded video frame at a down-sampling resolution, reference may be made to a reference frame at an original resolution for a to-be-encoded video frame at an original resolution, and reference may be made to a reference frame at a down-sampling resolution for a to-be-encoded video frame at a down-sampling resolution. The to-be-encoded video frame at an original resolution means that a resolution of the to-be-encoded video frame is the same as a resolution of an original video frame corresponding to the to-be-encoded video frame. The reference frame at an original resolution means that a resolution of the reference frame is the same as a resolution of an original video frame corresponding to the reference frame. The to-be-encoded video frame at a down-sampling resolution means that the to-be-encoded video frame is obtained by down-sampling a corresponding original video frame. The reference frame at a down-sampling resolution means that the reference frame is obtained by down-sampling a corresponding original video frame. After the first reference rule is obtained, the reference frame corresponding to the to-be-encoded video frame is obtained according to the first reference rule, the obtained reference frame meeting the first reference rule.

In an embodiment, the encoding the to-be-encoded video frame at the resolution of the to-be-encoded video frame to obtain the encoded data corresponding to the original video frame further includes: adding rule information corresponding to the first reference rule to the encoded data corresponding to the original video frame.

Specifically, the rule information is used for describing a used reference rule, and a flag Resolution_Referencer_Rules for describing a reference rule may be added to the encoded data. A reference rule represented by a specific value of the flag may be set according to a specific application. A location where the rule information is added to the encoded data may be one or more of GOP-level header information, sequence-level header information, and frame-level header information, which may be determined according to an action range corresponding to the first reference rule. For example, when the first reference rule is reference being made to a reference frame at a down-sampling resolution for a to-be-encoded video frame at an original resolution, corresponding Resolution_Referencer_Rules may be 1. When the first reference rule is reference being made to a reference frame at a down-sampling resolution for a to-be-encoded video frame at a down-sampling resolution, corresponding Resolution_Referencer_Rules may be 2. If a video frame sequence uses the same first reference rule, the location where the rule information is added to the encoded data may be the sequence-level header information. If the first reference rule is a reference rule used for a GOP, the location where the rule information is added to the encoded data is GOP-level header information corresponding to the GOP using the first reference rule.

In an embodiment, the reference frame corresponding to the to-be-encoded video frame may be obtained, a pixel residual is obtained through prediction according to the reference frame, and the encoded data corresponding to the original video frame is obtained by performing transformation, quantization, and entropy encoding on the pixel residual. In a process of obtaining the encoded data, at least one of the reference frame, location information corresponding to each to-be-encoded block of the to-be-encoded video frame, location information of each reference block of the reference frame, and the MV is processed according to the resolution of the to-be-encoded video frame. After the reference frame is obtained, a reference block corresponding to the to-be-encoded block of the to-be-encoded video frame may be obtained from the reference frame, and the to-be-encoded block is encoded according to the reference block. Alternatively, the reference frame may be processed according to the resolution of the to-be-encoded video frame, to obtain a corresponding target reference frame, a target reference block corresponding to the to-be-encoded block of the to-be-encoded video frame is obtained from the target reference frame, and the to-be-encoded block is encoded according to the target reference block, to obtain the encoded data corresponding to the original video frame.

In an embodiment, the encoding the to-be-encoded video frame at the resolution of the to-be-encoded video frame to obtain the encoded data corresponding to the original video frame includes: obtaining, at the resolution of the to-be-encoded video frame, a corresponding encoding format used to encode the to-be-encoded video frame; and adding encoding format information corresponding to the encoding format to the encoded data corresponding to the original video frame.

Specifically, the encoding format is a processing manner related to encoding, which, for example, may include one or more of an up-sampling manner used for a video frame after a reference frame is decoded and reconstructed during encoding, a rule corresponding to reference rule information, and a sampling manner used to sample the reference frame, and a resolution corresponding to an MV. As the encoding format information corresponding to the encoding format is added to the encoded data corresponding to the original video frame, encoded data corresponding to a to-be-decoded video frame may be decoded according to the encoding format information during decoding.

In an embodiment, the encoding format information corresponding to the encoding format may alternatively not be added to the encoded data. Instead, an encoding format is preset in a codec standard, and a decoding format corresponding to the encoding format is set at the decoding side. Alternatively, the encoding side and the decoding side may obtain, through calculation according to the same or corresponding algorithms, an encoding format and a decoding format that are matched. For example, it is preset in a codec standard that a method for up-sampling a reference frame during encoding is the same as a method for up-sampling a reference frame during decoding.

In an embodiment, the encoding the to-be-encoded video frame according to the reference frame to obtain the encoded data corresponding to the original video frame includes: sampling the reference frame according to the resolution information of the to-be-encoded video frame; and encoding the to-be-encoded video frame according to the sampled reference frame, to obtain the encoded data corresponding to the original video frame.

The sampling is a process of sampling the reference frame by using the resolution information of the to-be-encoded video frame, so that resolution information of the sampled reference frame matches the resolution information of the to-be-encoded video frame. A sampling manner may be determined first before the sampling, which includes one of a direct fractional pixel interpolation manner and an after-sampling fractional pixel interpolation manner. The direct fractional pixel interpolation manner is directly performing fractional pixel interpolation processing on the reference frame. The after-sampling fractional pixel interpolation manner is sampling the reference frame and then performing fractional pixel interpolation processing.

The fractional pixel interpolation is a process of obtaining fractional-pixel-level reference data through interpolation of reference data of integer pixels in the reference frame. For example, FIG. 8 and FIG. 9 are schematic diagrams of interpolation of a reference frame according to an embodiment. Referring to FIG. 8, pixels such as A1, A2, A3, B1, B2, and B3 are 2*2 integer pixels in the reference frame, and reference data of a fractional pixel is obtained through calculation according to reference data of the integer pixels. For example, reference data of a fractional pixel a23 may be obtained by calculating an average value of reference data of three integer pixels A1, A2, and A3, reference data of a fractional pixel a21 may be obtained by calculating an average value of reference data of three integer pixels A2, B2, and C2, and then reference data of a fractional pixel a22 may be obtained through calculation according to the reference data of the fractional pixels a23 and a21, to implement interpolation of a ½ pixel precision on the reference frame.

Referring to FIG. 9, pixels such as A1, A2, A3, B1, B2, and B3 are 4*4 integer pixels in the reference frame, and reference data of 15 fractional pixels is obtained through calculation according to reference data of the integer pixels, to implement interpolation of a ¼ pixel precision on the reference frame. For example, reference data of a fractional pixel a8 is obtained through calculation according to reference data of the integer pixels A2 and B2, reference data of a fractional pixel a2 is obtained through calculation according to reference data of the integer pixels A2 and A3, and so on until the reference data of the 15 fractional pixels a1 to a15 is obtained through calculation, to implement interpolation of a ¼ pixel precision on the reference frame. In a process of encoding the to-be-encoded video frame, a motion search technology needs to be used in the reference frame to find a reference block corresponding to a to-be-encoded block in the to-be-encoded video frame, an MV is obtained through calculation according to motion information of the to-be-encoded block relative to the reference block, and the MV is encoded to tell the decoding side a location of reference data corresponding to the reference block in the reference frame. Therefore, when fractional pixel interpolation processing is performed on the reference frame, a reference frame obtained after the fractional pixel interpolation processing has a higher resolution, motion estimation may be performed for the to-be-encoded video frame according to the reference frame having a higher resolution, thereby improving motion estimation accuracy and improving encoding quality.

In an embodiment, sampling manners used for a reference frame may be configured in respective codec rules at the encoding side and the decoding side, which need to be consistent. During encoding and decoding, a sampling manner used for a reference frame is determined according to the configuration.

In an embodiment, the encoding the to-be-encoded video frame at the resolution of the to-be-encoded video frame to obtain the encoded data corresponding to the original video frame includes: adding sampling manner information corresponding to sampling of the reference frame to the encoded data corresponding to the original video frame. A location where the sampling manner information corresponding to sampling of the reference frame is added to the encoded data may be any one of corresponding sequence-level header information, GOP-level header information, and frame-level header information, which may be determined according to an action range corresponding to a sampling manner. The sampling manner information may be added to frame-level header information of the encoded data corresponding to the original video frame, to indicate that fractional pixel interpolation processing is performed on a corresponding reference frame in a sampling manner corresponding to the sampling manner information when the original video frame is encoded. For example, when a flag Pixel_Sourse_Interpolation used for determining a sampling manner is 0 in the frame-level header information of the encoded data, it indicates that direct fractional pixel interpolation processing is performed on the reference frame corresponding to the original video frame. When Pixel_Sourse_Interpolation is 1, it indicates that the reference frame corresponding to the original video frame is sampled and then fractional pixel interpolation processing is performed. The decoding side may perform fractional pixel interpolation processing on a reference frame in the fractional pixel interpolation manner indicated by the flag in the encoded data, and then may decode the encoded data according to a reference frame obtained after the fractional pixel interpolation processing to obtain a reconstructed video frame.

In an embodiment, a ratio for sampling a reference frame may be determined according to a ratio relationship between a resolution of a to-be-encoded video frame and a resolution of the reference frame. For example, resolutions of all original video frames are 2M*2N. If an original video frame is processed in the full resolution processing manner, that is, the original video frame is directly used as a to-be-encoded video frame, a resolution of the to-be-encoded video frame is 2M*2N. An original video frame that may be used as a reference frame is processed in the down-sampling processing manner. If it is obtained that a resolution of a current to-be-encoded reference frame after down-sampling is M*2N, a corresponding resolution of a reference frame obtained after reconstruction is also M*2N. Therefore, it is determined to up-sample the reference frame by using a sampling ratio with a width of 2 and a height of 1, to obtain a frame having the same resolution as the to-be-encoded video frame. If an original video frame is processed in the down-sampling processing manner, a resolution of a to-be-encoded video frame obtained after down-sampling is M*N. If an original video frame that may be used as a reference frame is processed in the full resolution processing manner, a resolution of a reference frame obtained after reconstruction is 2M*2N. Therefore, it is determined to down-sample the reference frame by using a sampling ratio with a width and a height both being ½, to obtain a frame having the same resolution as the to-be-encoded video frame.

In an embodiment, because resolutions of original video frames are generally the same, a ratio for sampling a reference frame may be determined according to a downsampling ratio corresponding to a to-be-encoded video frame obtained by down-sampling an original video frame and a down-sampling ratio corresponding to a to-be-encoded reference frame obtained by down-sampling an original video frame that may be used as a reference frame. For example, a to-be-encoded video frame is obtained by down-sampling an original video frame by using a sampling ratio of 1/2; a to-be-encoded reference frame is obtained by down-sampling an original video frame that may be used as a reference frame by using a sampling ratio of 1/4, and a down-sampling ratio corresponding to a reference frame obtained after reconstruction according to encoded data of the to-be-encoded reference frame is also 1/4. Therefore, according to a multiple relationship between down-sampling ratios of the two, it may be determined that the reference frame is up-sampled by using a sampling ratio of 2 to obtain a frame having the same resolution as the to-be-encoded video frame.

In an embodiment, a sampling algorithm for sampling a reference frame matches a sampling algorithm for down-sampling an original video frame to obtain a to-be-encoded video frame. That is, a down-sampling algorithm used to down-sample a reference frame is the same as a down-sampling algorithm used to down-sample a to-be-encoded video frame. An up-sampling algorithm used to up-sample a reference frame is a sampling algorithm inverse to the down-sampling algorithm used to down-sample an original video frame.

In one embodiment, as the sampling algorithm for sampling a reference frame matches the down-sampling algorithm used to down-sample a to-be-encoded video frame, a degree of image matching between the reference frame and the down-sampled to-be-encoded video frame may be further improved, thereby improving accuracy of inter-frame prediction, reducing a pixel residual, and improving quality of an encoded image.

In an embodiment, after the reference frame is sampled, an image block similar to a to-be-encoded block is found in the sampled reference frame, and a pixel residual is obtained by calculating a pixel difference between the to-be-encoded block and the reference block. An MV corresponding to the to-be-encoded block is obtained according to a displacement of the to-be-encoded block relative to the corresponding reference block. Encoded data is obtained according to the obtained MV and the pixel residual.

In an embodiment, the MV corresponding to the to-be-encoded block may be transformed according to the target MV resolution information, to obtain a target MV at the target resolution, and encoded data is generated according to the target MV and the pixel residual. A method for transforming an MV corresponding to a to-be-encoded block according to target MV resolution information, to obtain a target MV at a target resolution is described below. It may be understood that, a resolution represented by the target MV resolution information is the target resolution.

In an embodiment, quantization or other encoding processing may be directly performed on a target MV to obtain encoded data. In another embodiment, alternatively, an MVD between a target MV and a corresponding MVP may be calculated, and the MVD is encoded to obtain encoded data, thereby further reducing an amount of the encoded data.

In an embodiment, the sampling the reference frame according to the resolution information of the to-be-encoded video frame includes: sampling the reference frame according to the resolution information of the to-be-encoded video frame and a motion estimation pixel precision.

The motion estimation pixel precision is a unit length of an MV corresponding to a to-be-encoded block in the to-be-encoded video frame. When encoding a to-be-encoded block in the to-be-encoded video frame, the encoding side may refine a unit length of an MV corresponding to the to-be-encoded block according to an obtained motion estimation pixel precision, so that an obtained MV is more precise and accurate. Therefore, a reference frame needs to be sampled according to the obtained motion estimation pixel precision, then an MV corresponding to each to-be-encoded block in the to-be-encoded video frame is calculated according to the sampled reference frame, and encoding is performed based on the MV to obtain the encoded data corresponding to the to-be-encoded video frame.

Specifically, resolution information of the reference frame may be obtained, and a sampling processing method, a sampling ratio corresponding to sampling, and a pixel interpolation precision are determined for the reference frame according to a fractional pixel interpolation manner used for the to-be-encoded video frame, the resolution information of the to-be-encoded video frame, the resolution information of the reference frame, and the motion estimation pixel precision corresponding to the to-be-encoded video frame. A value of the motion estimation pixel precision may be set according to a specific application, which is generally, for example, a ½ pixel precision, a ¼ pixel precision, or a ⅛ pixel precision.

In an embodiment, a corresponding motion estimation pixel precision may be configured for the to-be-encoded video frame according to image feature information of the to-be-encoded video frame. The image feature information is information representing a feature of an image in the to-be-encoded video frame. The image feature information includes at least one of a size, texture information, and a motion speed of the to-be-encoded video frame. The motion estimation pixel precision corresponding to the to-be-encoded video frame may be comprehensively determined by using a plurality of pieces of image feature information.

It may be understood that, a to-be-encoded video frame carrying more complex image data and more diversified image information corresponds to a higher motion estimation pixel precision. For example, during inter-frame prediction for a P frame, a relatively high motion estimation pixel precision may be used to calculate an MV corresponding to each to-be-encoded block in the P frame. During inter-frame prediction for a B frame, a relatively low motion estimation pixel precision may be used to calculate an MV corresponding to each to-be-encoded block in the B frame.

In an embodiment, the sampling the reference frame according to the resolution information of the to-be-encoded video frame and a motion estimation pixel precision includes: obtaining a pixel interpolation precision through calculation according to the resolution information of the to-be-encoded video frame and the motion estimation pixel precision; and directly performing fractional pixel interpolation processing on the reference frame according to the pixel interpolation precision.

Specifically, the pixel interpolation precision is a pixel precision corresponding to fractional pixel interpolation on a reference frame. When the fractional pixel interpolation manner is the direct fractional pixel interpolation manner, it indicates that fractional pixel interpolation processing can be directly performed on the reference frame. Therefore, the pixel interpolation precision may be obtained through calculation according to the resolution information of the to-be-encoded video frame and the motion estimation pixel precision. A ratio of the resolution information of the reference frame to the resolution information of the to-be-encoded video frame may be calculated, and the pixel interpolation precision is obtained according to the ratio and the motion estimation pixel precision.

In an embodiment, when the resolution of the reference frame is greater than the resolution of the to-be-encoded video frame, data of some fractional pixels in the reference frame may be directly reused as data corresponding to fractional pixels corresponding to the motion estimation pixel precision. For example, the resolution of the to-be-encoded video frame is M*N, and the resolution of the reference frame is 2M*2N. If the motion estimation pixel precision is ½, the pixel interpolation precision is 1, and the reference frame may be directly used without fractional pixel interpolation processing. If the motion estimation pixel precision is ¼, a pixel interpolation precision obtained through calculation is ½, and fractional pixel interpolation processing may be performed on the reference frame by using the pixel interpolation precision of ½.

In an embodiment, when the resolution represented by the resolution information of the to-be-encoded video frame is the same as the resolution of the reference frame, fractional pixel interpolation processing is directly performed on the reference frame according to the motion estimation pixel precision.

Specifically, when the to-be-encoded video frame is obtained by processing the original video frame in the full resolution processing manner and the resolution of the reference frame is also an original resolution, the resolution of the to-be-encoded video frame and the resolution of the reference frame are the same. It may be understood that, the original resolution is a resolution of the original video frame. Alternatively, if the to-be-encoded video frame is obtained by processing the original video frame in the down-sampling processing manner and the reference frame is also obtained through reconstruction by using encoded data that is obtained through encoding in the down-sampling processing manner with the same sampling ratio, the resolution of the to-be-encoded video frame and the resolution of the reference frame are the same. Then, fractional pixel interpolation processing may be directly performed on the reference frame based on the motion estimation pixel precision, and a pixel interpolation precision corresponding to the fractional pixel interpolation processing is the same as the motion estimation pixel precision.

In an embodiment, the sampling the reference frame according to the resolution information of the to-be-encoded video frame and a motion estimation pixel precision includes: sampling the reference frame according to the resolution information of the to-be-encoded video frame; and performing fractional pixel interpolation processing on the sampled reference frame according to the motion estimation pixel precision.

It may be understood that, the computer device may encode the to-be-encoded video frame according to the reference frame on which the fractional pixel interpolation processing is performed, to obtain the encoded data corresponding to the original video frame.

Specifically, when the fractional pixel interpolation manner corresponding to the to-be-encoded video frame is the after-sampling fractional pixel interpolation manner, it indicates that the reference frame needs to be sampled first to obtain an intermediate reference frame having the same resolution as the to-be-encoded video frame, and then fractional pixel interpolation processing is performed on the intermediate reference frame, to obtain the reference frame on which the fractional pixel interpolation processing is performed.

When the resolution represented by the resolution information of the to-be-encoded video frame is less than the resolution of the reference frame, the reference frame is down-sampled according to the resolution information of the to-be-encoded video frame to obtain an intermediate reference frame, and then fractional pixel interpolation processing is performed on the intermediate reference frame according to the motion estimation pixel precision corresponding to the to-be-encoded video frame, to obtain the reference frame on which the fractional pixel interpolation processing is performed.

For example, if a to-be-encoded video frame having a resolution of M*N is obtained by down-sampling an original video frame having a resolution of 2M*2N in the down-sampling processing manner, and a reference frame has a resolution of 2M*2N (in the full resolution processing manner), an intermediate reference frame having a resolution of M*N is obtained by down-sampling the reference frame according to a sampling ratio of 1/2. If the obtained to-be-encoded video frame corresponds to a motion estimation pixel precision of ½, fractional pixel interpolation processing is further performed on the intermediate reference frame according to a pixel interpolation precision (a fractional pixel interpolation precision of 1/2) the same as the motion estimation pixel precision. If the obtained to-be-encoded video frame corresponds to a motion estimation pixel precision of 1/4, fractional pixel interpolation processing is performed on the intermediate reference frame according to a fractional pixel interpolation precision of 1/4.

When the resolution represented by the resolution information of the to-be-encoded video frame is greater than the resolution of the reference frame, the reference frame is up-sampled according to the resolution information of the to-be-encoded video frame to obtain an intermediate reference frame, and then fractional pixel interpolation processing is performed on the intermediate reference frame based on the motion estimation pixel precision corresponding to the to-be-encoded video frame. For example, if the resolution of the to-be-encoded video frame is 2M*2N, and the resolution of the reference frame is 1/2M*½N, the reference frame needs to be up-sampled according to a sampling ratio of 4 to obtain an intermediate reference frame having the same resolution as the to-be-encoded video frame. If the motion estimation pixel precision is 1/2, fractional pixel interpolation processing is further performed on the obtained intermediate reference frame according to a pixel interpolation precision of 1/2. If the motion estimation pixel precision is 1/4, fractional pixel interpolation processing is further performed on the obtained intermediate reference frame according to a pixel interpolation precision of 1/4.

In an embodiment, the target MV resolution information may not be selected. In this case, for a current to-be-encoded block, the computer device may determine a coordinate transformation parameter according to the current resolution information of the to-be-encoded video frame and the resolution information of the reference frame; obtain first location information of the current to-be-encoded block, obtain second location information of a reference block corresponding to the current to-be-encoded block; and obtain a target MV corresponding to the current to-be-encoded block through calculation according to the coordinate transformation parameter, the first location information, and the second location information.

The current resolution information is used for representing the current resolution of the to-be-encoded video frame. The current to-be-encoded block is a to-be-encoded block currently requiring predictive coding in the original video frame. The reference block is an image block in the reference frame and used for performing predictive coding on the current to-be-encoded block. The first location information corresponding to the current to-be-encoded block may be represented by using pixel coordinates. The first location information corresponding to the current to-be-encoded block may include coordinates corresponding to all pixels of the current to-be-encoded block, or may include coordinates of one or more pixels of the current to-be-encoded block. The second location information corresponding to the reference block may include coordinates corresponding to all pixels of the reference block, or may include coordinates of one or more pixels of the reference block. For example, coordinates of the first pixel of the current to-be-encoded block may be used as coordinate values of the current to-be-encoded block, and coordinates of the first pixel of the reference block may be used as coordinate values of the reference block.

Specifically, the computer device may transform the first location information by using the coordinate transformation parameter to obtain corresponding first location transformed information, and obtain a target MV according to a difference between the first location transformed information and the second location information; or may transform the second location information by using the coordinate transformation parameter to obtain corresponding second location transformed information, and obtain a target MV according to a difference between the first location information and the second location transformed information.

In an embodiment, the coordinate transformation parameter is a ratio obtained by dividing higher resolution information by lower resolution information in the resolution information of the to-be-encoded video frame and the resolution information of the reference frame. A resolution corresponding to the higher resolution information is greater than a resolution corresponding to the lower resolution information. The coordinate transformation parameter is used for transforming location information of a frame with the lower resolution information in the to-be-encoded video frame and the reference frame. For example, if the resolution of the to-be-encoded video frame is 1200*1200 pixels, and the resolution of the reference frame is 600*600 pixels, a higher resolution is 1200*1200 pixels, and a lower resolution is 600*600 pixels. The coordinate transformation parameter may be 2. It is assumed that the first location information is (6, 8), and the second location information is (3, 3). Then a target MV is (6, 8)−(3*2, 3*2)=(0, 2). In one embodiment of the present disclosure, the location information of the frame with the lower resolution information is transformed, which may reduce a value of the target MV, and reduce a data amount of the encoded data.

In an embodiment, the coordinate transformation parameter is a ratio obtained by dividing lower resolution information by higher resolution information in the resolution information of the to-be-encoded video frame and the resolution information of the reference frame. The coordinate transformation parameter is used for transforming location information of a frame with the higher resolution information in the to-be-encoded video frame and the reference frame. For example, the resolution of the to-be-encoded video frame is 1200*1200 pixels, the resolution of the reference frame is 600*600 pixels, and the coordinate transformation parameter may be ½. It is assumed that the first location information is (6, 8), and the second location information is (3, 3). Then a target MV is (6*½, 8*½)−(3, 3)=(0, 1).

In one embodiment of the present disclosure, the location information is transformed by using the coordinate transformation parameter, so that obtained location information is at the same quantization dimension, which may reduce a value of the target MV, and reduce a data amount of the encoded data.

Figure 10:
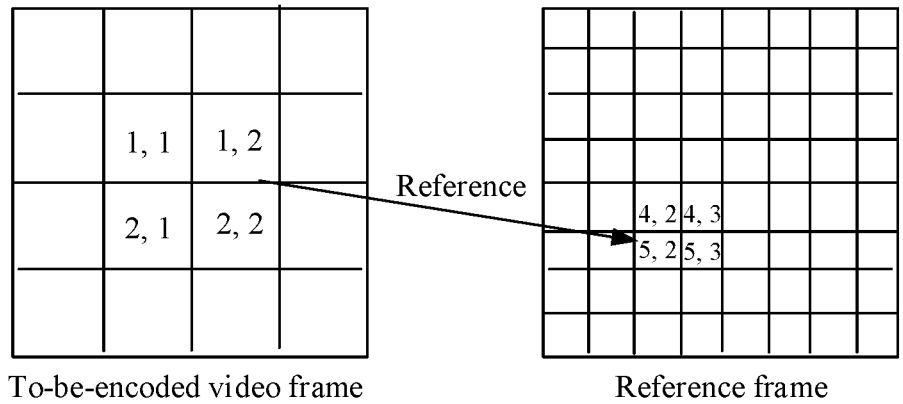
FIG. 10 is a schematic diagram of a current reference frame and a to-be-encoded video frame according to an embodiment of the present disclosure.

For example, as shown in FIG. 10, a resolution of a reference frame is twice a resolution of a to-be-encoded video frame, a current to-be-encoded block includes pixels (1, 1), (1, 2), (2, 1), and (2, 2), and a corresponding target reference block includes pixels (4, 2), (4, 3), (5, 2), and (5, 3). If transformation is not performed, a target MV is (−3, −1). However, if corresponding location information in the to-be-encoded video frame is multiplied by 2 and then a target MV is calculated, the target MV is (−2, 0), which is less than (−3, −1).

In an embodiment, the obtaining a processing manner corresponding to the original video frame includes: calculating a proportion of a to-be-encoded block of a target prediction type in a forward coded video frame corresponding to the original video frame; and determining the processing manner corresponding to the original video frame according to the proportion.

Specifically, a to-be-encoded block of a prediction type is a to-be-encoded block corresponding to a frame prediction type. The proportion of a to-be-encoded block of a target prediction type may be one or both of a proportion corresponding to an intra-coded block and a proportion corresponding to an inter-coded block. The proportion of the to-be-encoded block of the target prediction type in the forward coded video frame corresponding to the original video frame may be a proportion of the to-be-encoded block of the target prediction type to a to-be-encoded block of another prediction type, or may be a proportion of the to-be-encoded block of the type to a total quantity of to-be-encoded blocks, which may be specifically set according to a specific application. For example, a first quantity of intra-coded blocks in the forward coded video frame and a second quantity of inter-coded blocks in the forward coded video frame may be obtained. A proportion of the intra-coded blocks to the inter-coded blocks is obtained through calculation according to the first quantity and the second quantity. Alternatively, a third quantity of all to-be-encoded blocks of the forward coded video frame is counted, and a proportion of the intra-coded blocks to all the to-be-encoded blocks is obtained through calculation according to the first quantity and the third quantity. Further, a proportion of the inter-coded blocks to all the to-be-encoded blocks is obtained through calculation according to the second quantity and the third quantity.

The forward coded video frame is a video frame that is encoded before a current input original video frame is encoded. A specific quantity of obtained forward coded video frames may be customized. For example, one encoded video frame that is encoded before the original video frame is obtained as a forward coded video frame, or three encoded video frames that are encoded before the original video frame are obtained as forward coded video frames. After the corresponding proportion of the to-be-encoded block of the target prediction type in the forward coded video frame is obtained through calculation, the processing manner corresponding to the original video frame is determined according to the proportion obtained through calculation. If a plurality of forward coded video frames are obtained, corresponding proportions of to-be-encoded blocks of different types in each forward coded video frame may be obtained through calculation, an overall proportion is obtained through weighted calculation according to the proportions, and then the processing manner corresponding to the original video frame is determined according to the overall proportion and a preset threshold. A weight corresponding to a forward coded video frame may be in a negative correlation with an encoding distance between the forward coded video frame and the original video frame.

In an embodiment, a proportion of an intra-coded block in a forward coded video frame to the forward coded video frame may be calculated, and when the proportion is greater than a target threshold, it is determined that the processing manner is the down-sampling processing manner.

For the proportion corresponding to the intra-coded block, when the proportion is greater than the target threshold, it may be determined that the processing manner corresponding to the original video frame is the down-sampling processing manner. Otherwise, it is determined that the processing manner corresponding to the original video frame is the full resolution processing manner. For example, when the proportion is greater than the target threshold, it is determined that the processing manner corresponding to the original video frame is the down-sampling processing manner. Otherwise, it is determined that the processing manner corresponding to the original video frame is the full resolution processing manner.

In one embodiment of the present disclosure, if the intra-coded block has a large proportion, it indicates that a video is relatively complex or video frames are not much correlated, and therefore, an obtained pixel residual is relatively large. Therefore, the down-sampling processing manner is preferred for encoding, to reduce an amount of the encoded data.

The target threshold may be determined according to a processing manner of a reference frame corresponding to the original video frame. When the processing manner of the reference frame corresponding to the original video frame is the down-sampling processing manner, a first preset threshold T1 is obtained as the target threshold. Similarly, when the processing manner of the reference frame corresponding to the original video frame is the full resolution processing manner, a second preset threshold T2 is obtained as the target threshold. Further, after the target threshold is obtained according to resolution information of the reference frame corresponding to the original video frame, the processing manner of the current input original video frame is determined according to the target threshold and the proportion of the intra-coded block in the forward coded video frame to the forward coded video frame. When the proportion of the intra-coded block in the forward coded video frame to the forward coded video frame is greater than the target threshold, it is determined that the processing manner corresponding to the original video frame is the down-sampling processing manner.

In an embodiment, the second preset threshold is greater than the first preset threshold. In this way, when the processing manner corresponding to the reference frame is the full resolution processing manner, the original video frame prefers the full resolution processing manner; when the processing manner corresponding to the reference frame is the down-sampling processing manner, the original video frame prefers the down-sampling processing manner.

In an embodiment, before the obtaining the original video frame, the video encoding method further includes: obtaining an input video frame sequence corresponding to the original video frame, and obtaining a target video frame sequence encoding mode corresponding to the input video frame sequence, the target video frame sequence encoding mode including a constant resolution encoding mode or a mixed resolution encoding mode; and determining whether the target video frame sequence encoding mode is the mixed resolution encoding mode, and if yes, performing the step of obtaining the original video frame, or if no, performing constant resolution encoding on each original video frame of the input video frame sequence.

Specifically, the input video frame sequence may include a plurality of original video frames. When the target video frame sequence encoding mode is the constant resolution encoding mode, each original video frame of the input video frame sequence is encoded at the same resolution, for example, in the full resolution processing manner. When the target video frame sequence encoding mode is the mixed resolution encoding mode, a processing manner corresponding to each original video frame is obtained, the original video frame is processed in the processing manner to obtain a to-be-encoded video frame, and encoding is performed according to the to-be-encoded video frame. A resolution of the to-be-encoded video frame may be the same as a resolution of the original video frame, or may be less than the resolution of the original video frame. The input video frame sequence may include to-be-encoded video frames having different resolutions. Therefore, when a video frame sequence encoding mode is the mixed resolution encoding mode, the video encoding method provided in the foregoing embodiment is performed.

In an embodiment, the obtaining a target video frame sequence encoding mode corresponding to the input video frame sequence includes: obtaining current environment information, the current environment information including at least one piece of information in current encoding environment information and current decoding environment information; and determining the target video frame sequence encoding mode corresponding to the input video frame sequence according to the current environment information.

Specifically, the environment information may include one or more of information representing a processing capability of a device performing a video encoding method, information representing a processing capability of a device performing a video decoding method, and current application scenario information. The processing capability may be represented by using a processing speed. For example, for a device having a strong processing capability, because of a fast processing speed, a corresponding target video frame sequence encoding mode is a full resolution encoding mode (it may be understood that, the full resolution encoding mode is a constant resolution encoding mode in a special case). When a current application scenario corresponding to the current application scenario information is a real-time application scenario, a video frame sequence encoding mode is the mixed resolution encoding mode. When the current application scenario corresponding to the current application scenario information is a non-real-time application scenario, a video frame sequence encoding mode is the constant resolution encoding mode. A correspondence between current environment information and a video frame sequence encoding mode may be set.

After the current environment information is obtained, the target video frame sequence encoding mode corresponding to the input video frame sequence is obtained according to the correspondence between current environment information and a video frame sequence encoding mode. For example, a correspondence between a video frame sequence encoding mode and an average value between a processing speed of a device performing a video encoding method and a processing speed of a device performing a video decoding method may be set. After the processing speed of the device performing the video encoding method and the processing speed of the device performing the video decoding method are obtained, an average value is calculated, and the target video frame sequence encoding mode is obtained according to the average value. Whether the current application scenario is a real-time application scenario may be set according to a specific application. For example, a video call application scenario and a gaming application scenario are real-time application scenarios, and application scenarios corresponding to video encoding on a video website and encoding of an offline video may be non-real-time application scenarios.

Specifically, when the video frame sequence encoding mode is the constant resolution encoding mode, constant resolution encoding is performed on each original video frame of the input video frame sequence.

In an embodiment, the encoding the to-be-encoded video frame at the resolution of the to-be-encoded video frame to obtain the encoded data corresponding to the original video frame includes: adding video frame sequence encoding mode information corresponding to the target video frame sequence encoding mode to the encoded data.

Specifically, the video frame sequence encoding mode information is used for describing an encoding mode used for the input video frame sequence, and a flag Sequence_Mix_Resolution_Flag for describing a video frame sequence encoding mode may be added to the encoded data. A specific value of the flag may be set according to a specific application. A location where the video frame sequence encoding mode information is added to the encoded data may be sequence-level header information. For example, when Sequence_Mix_Resolution_Flag is 1, a corresponding target video frame sequence encoding mode may be the mixed resolution encoding mode. When Sequence_Mix_Resolution_Flag is 0, a corresponding target video frame sequence encoding mode may be the constant resolution encoding mode.

Figure 11:
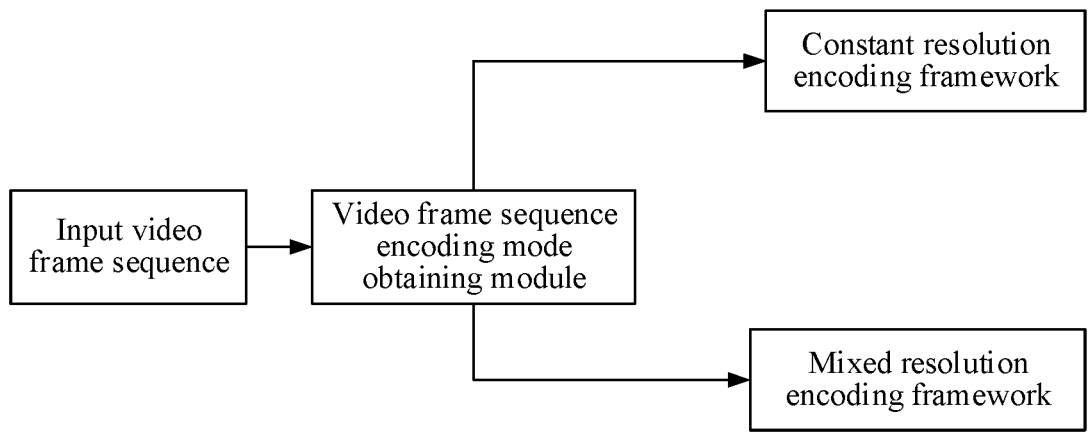
FIG. 11 is a schematic diagram of a video encoding framework according to an embodiment of the present disclosure.

In an embodiment, a video encoding framework is shown in FIG. 11. The video encoding framework includes a constant resolution encoding framework and a mixed resolution encoding framework. The mixed resolution encoding framework may correspond to the encoding framework in FIG. 2. After an input video frame sequence is obtained, a video frame sequence encoding mode obtaining module decides a video frame sequence encoding mode. When a target video frame sequence encoding mode is the mixed resolution encoding mode, the mixed resolution encoding framework is used to perform encoding. When a target video frame sequence encoding mode is the constant resolution encoding mode, the constant resolution encoding framework in FIG. 11 is used to perform constant resolution encoding. The constant resolution encoding framework may be an HEVC encoding framework, an H.265 encoding framework, or the like at present.

The video encoding method is described below by assuming that a video frame sequence A includes three original video frames a, b, and c.

1. A target video frame sequence encoding mode corresponding to the video frame sequence A is obtained. Because a current environment is a video call environment, the target video frame sequence encoding mode is the mixed resolution encoding mode.

2. A decision is made for the first original video frame a by using a processing deciding unit in the mixed resolution encoding framework, and it is obtained that a processing manner is the down-sampling processing manner, and a down-sampling ratio is ½; a is down-sampled to obtain a down-sampled video frame a1; intra-coding is performed on a1 to obtain encoded data d1 corresponding to a1; and reconstruction is performed according to the encoded data corresponding to a1 to obtain a corresponding reconstructed video frame a2.

3. A decision is made for the second original video frame b by using the processing deciding unit in the mixed resolution encoding framework, and it is obtained that a processing manner is the down-sampling processing manner, and a sampling ratio is ¼; b is down-sampled to obtain b1; b1 is encoded to obtain encoded data corresponding to b; and sampling ratio information corresponding to the down-sampling ratio and processing manner information corresponding to the processing manner are added to the encoded data.

An encoding process includes as follows: Because b is an inter-frame predicted frame, a2 needs to be used as a reference frame. Because resolutions of b1 and a2 are different, a2 needs to be sampled. It is determined that a sampling manner of a2 is direct fractional pixel interpolation, and a motion estimation precision is ¼. Therefore, a pixel interpolation precision is ¼*2=½. ½ fractional pixel interpolation is performed on a2 according to the pixel interpolation precision, to obtain a reference frame a3. A first MV MV1 between a current to-be-encoded block in b1 and a target reference block in the reference frame a3 is calculated and a pixel residual is p1. Moreover, it is obtained that a target resolution is an original resolution, and therefore, a target MV is 4MV1. An initial MV is MV2, which is obtained through calculation at a resolution corresponding to the down-sampling ratio of 1/4. Therefore, a target MV is 4MV2, and an MVD corresponding to the current to-be-encoded block is MVD1=4MV1−4MV2. Transformation, quantization, and entropy encoding are performed on MVD1 and p1 to obtain encoded data.

4. A decision is made for the third original video frame c by using the processing deciding unit in the mixed resolution encoding framework, and it is obtained that a processing manner is the down-sampling processing manner, and a sampling ratio is ⅛; c is down-sampled to obtain c1; and c1 is encoded to obtain encoded data d2 corresponding to c.

An encoding process includes as follows: Because c is an inter-frame predicted frame, a corresponding reference frame is a reconstructed video frame b2 obtained through reconstruction according to the encoded data of b. Because resolutions of c1 and b2 are different, b2 needs to be sampled. It is determined that a sampling manner of b2 is direct fractional pixel interpolation, and a motion estimation precision is ¼. Therefore, a pixel interpolation precision is ¼*2=½. ½ fractional pixel interpolation is performed on b2 according to the pixel interpolation precision, to obtain a reference frame b3. A first MV MV3 between a current to-be-encoded block in c1 and a target reference block in the reference frame b3 is calculated and a pixel residual is p2. Moreover, it is obtained that a target resolution is an original resolution, and therefore, a target MV is 8MV3. An initial MV is MV4, which is obtained through calculation at a resolution corresponding to the down-sampling ratio of 1/4. Therefore, a target MV is 4MV4, and an MVD corresponding to the current to-be-encoded block is MVD2=8MV3−4MV4. Transformation, quantization, and entropy encoding are performed on MVD2 and p2 to obtain encoded data d3.

5. d1, d2, and d3 are included in an encoded data packet as encoded data corresponding to the video frame sequence and sent to a receiving terminal. The encoded data corresponding to the video frame sequence carries a flag indicating that a target video frame sequence encoding mode is the mixed resolution encoding mode.

Figure 12:
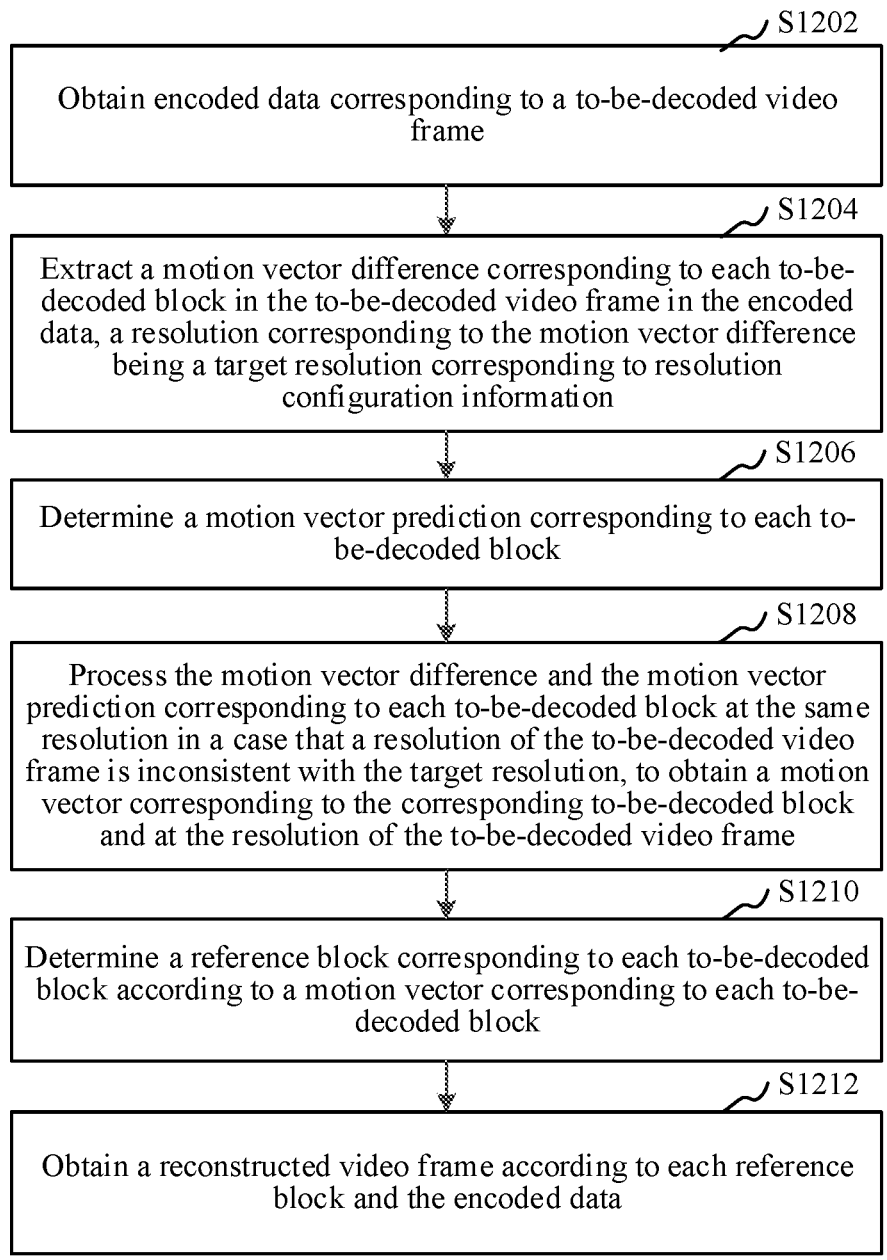
FIG. 12 is a flowchart of a video decoding method according to an embodiment of the present disclosure.

As shown in FIG. 12, in an embodiment, a video decoding method is provided, and the method is applied to a computer device. The computer device may be the terminal 110 or the server 120 in FIG. 1. Referring to FIG. 12, the video decoding method specifically includes the following steps:

S1202. Obtain encoded data corresponding to a to-be-decoded video frame.

The to-be-decoded video frame is a video frame that needs to be decoded. A video frame may be reconstructed by decoding the encoded data corresponding to the to-be-decoded video frame with reference to a reference frame of the to-be-decoded video frame. One to-be-decoded video frame sequence may include a plurality of to-be-decoded video frames. The to-be-decoded video frame may be a video frame obtained in real time, or may be a video frame obtained from a pre-stored to-be-decoded video frame sequence.

S1204. Extract an MVD corresponding to each to-be-decoded block in the to-be-decoded video frame in the encoded data, a resolution corresponding to the MVD being a target resolution corresponding to resolution configuration information.

The resolution configuration information is agreed with an encoding side in advance. That is, the resolution configuration information herein at a decoding side is consistent with resolution configuration information that is used at the encoding side during encoding. In other words, the encoding side obtains the encoded data by encoding the MVD according to the target resolution corresponding to the resolution configuration information. The decoding side may agree with the encoding side in advance that after the MVD sent from the encoding side is obtained, it may be considered by default that a resolution corresponding to the MVD is the target resolution corresponding to the resolution configuration information.

A process of reconstructing the to-be-decoded video frame may be considered as a process of restoration to an unencoded video frame according to the encoded data, that is, a process of restoration to a to-be-encoded video frame. If no image information is lost in an encoding process, the reconstructed video frame and the to-be-encoded video frame are the same. If image information is lost in the encoding process, a difference between the reconstructed video frame and the to-be-encoded video frame corresponds to a loss value.

Because the encoded data is obtained through encoding according to an MVD and other data (for example, a pixel residual) of each to-be-encoded block in the to-be-encoded video frame, the MVD corresponding to each to-be-decoded block in the to-be-decoded video frame may be obtained by decoding the encoded data.

Specifically, the computer device performs one or more operations of entropy decoding, dequantization, or inverse transformation on the encoded data to obtain the MVD corresponding to the to-be-decoded block. A decoding process herein corresponds to an encoding process of encoding the MVD to obtain the encoded data. The computer device may obtain, according to the resolution configuration information agreed with the encoding side in advance, the resolution corresponding to the MVD obtained through decoding.

S1206. Determine an MVP corresponding to each to-be-decoded block.

A calculation manner of the MVP is not limited in the present disclosure. The computer device may obtain the MVP of the to-be-decoded block through calculation by using an MV of a decoded block. For example, an average value of MVs corresponding to a plurality of decoded blocks adjacent to a current to-be-decoded block may be used as an MVP of the current to-be-decoded block. Alternatively, an MV of an image block in a reference frame and corresponding to a current to-be-decoded block with respect to an image location may be used as an MVP of the current to-be-decoded block.

Specifically, the encoding side and the decoding side may agree in advance on a calculation manner of the MVP, so that an MVP the same as that during encoding is obtained during decoding, to ensure accuracy of a decoding result. Alternatively, the encoding side and the decoding side may agree in advance on a policy for selecting a calculation manner of the MVP, so that the two sides can obtain the same MVP, to ensure accuracy of a decoding result. Alternatively, the encoding side may write information representing a calculation manner of the MVP to the encoded data, to tell the decoding side to calculate the MVP in the calculation manner of the MVP.

It may be understood that, the MV is used for positioning, in the reference frame, a reference block that matches the to-be-decoded block, to reconstruct the to-be-decoded block. Therefore, for a to-be-decoded block, an MV, when applied, is transformed to a resolution of a video frame in which the to-be-decoded block is located. Because the decoded block has been decoded, the decoded block has a corresponding MV at a resolution of a video frame in which the decoded block is located. Therefore, when the MVP of the to-be-decoded block is obtained through calculation by using the MV of the decoded block, the MVP also corresponds to the resolution of the video frame in which the decoded block is located. However, the MV of the decoded block may alternatively be first obtained through calculation at another resolution and then transformed to the resolution of the video frame in which the decoded block is located. Therefore, the decoded block may have an MV at another resolution.

In an embodiment, a reference frame in video decoding corresponds to a reference frame in video encoding. In other words, if reference is made to a reference frame when a to-be-encoded video frame is encoded to obtain encoded data corresponding to a to-be-decoded video frame, reference is also made to the reference frame when the to-be-decoded video frame is reconstructed.

In an embodiment, a computer device at the encoding side may write a reference relationship in the encoding process to the encoded data. In this way, when decoding the to-be-decoded video frame, the computer device at the decoding side may directly position a reference frame corresponding to each to-be-decoded video frame. The computer device at the decoding side may further obtain resolution information corresponding to the reference frame, and target resolution information included in encoded data corresponding to the reference frame.

S1208. Process the MVD and the MVP corresponding to each to-be-decoded block at the same resolution in a case that a resolution of the to-be-decoded video frame is inconsistent with the target resolution, to obtain an MV corresponding to the corresponding to-be-decoded block and at the resolution of the to-be-decoded video frame.

It may be understood that, usually, resolutions of two pieces of data needs to be the same during calculation.

In one embodiment, the MVD and the MVP of each to-be-decoded block need to be added up to obtain the MV of the to-be-decoded block. The MV is used for positioning, in a reference frame, a reference block that matches the to-be-decoded block. Therefore, the MV needs to be at the resolution of the to-be-decoded video frame.

Therefore, when the target resolution is consistent with the resolution of the to-be-decoded video frame, that is, the MVD is at the resolution of the to-be-decoded video frame, if the MVP is also at the resolution of the to-be-decoded video frame, the MVD and the MVP may be directly added up to obtain the MV corresponding to the to-be-decoded block and at the resolution of the to-be-decoded video frame.

When the target resolution is inconsistent with the resolution of the to-be-decoded video frame, that is, the MVD is not at the resolution of the to-be-decoded video frame, the MVD and the MVP may be first adjusted to the same resolution different from the resolution of the to-be-decoded video frame and added up, and then a result is adjusted to the resolution of the to-be-decoded video frame. For example, the MVD is adjusted to a resolution corresponding to the MVP, or the MVP is adjusted to a resolution of the MVD.

Alternatively, when the target resolution is inconsistent with the resolution of the to-be-decoded video frame, that is, the MVD is not at the resolution of the to-be-decoded video frame, the MVD and the MVP may be both adjusted to the resolution of the to-be-decoded video frame and added up.

S1210. Determine a reference block corresponding to each to-be-decoded block according to an MV corresponding to each to-be-decoded block.

Specifically, for each to-be-decoded block of the to-be-decoded video frame, a start image location corresponding to the to-be-decoded block in the reference frame is determined, and then a target image location is determined at the start image location in the reference frame according to the MV. An image block at the target image location is the reference block of the to-be-decoded block.

S1212. Obtain a reconstructed video frame according to each reference block and the encoded data.

It may be understood that, the reconstructed video frame is a video frame obtained by reconstructing the to-be-decoded video frame.

Specifically, a pixel residual is a difference between an actual pixel value and a predicted pixel value of a to-be-decoded block. The predicted pixel value of the to-be-decoded block may be obtained according to a reference block. Therefore, for each to-be-decoded block of the to-be-decoded video frame, after the corresponding reference block is determined, a predicted pixel value of the to-be-decoded block may be determined according to the reference block, and an image block of the to-be-decoded video frame may be reconstructed according to the predicted pixel value and a pixel residual of the to-be-decoded block, to reconstruct a reconstructed video frame of the to-be-decoded video frame.

In the foregoing video decoding method, after the encoded data corresponding to the to-be-decoded video frame is obtained, the resolution corresponding to the MVD of each to-be-decoded block in the encoded data may be obtained according to the resolution configuration information agreed with the encoding side in advance. Therefore, after the MVP of each to-be-decoded block is obtained, the MVD and the MVP of each to-be-decoded block may be processed at the same resolution, to obtain the MV corresponding to each to-be-decoded block and at the resolution of the to-be-decoded video frame. In this way, accuracy of a found corresponding reference block can be improved, to accurately decode the encoded data, thereby improving decoding accuracy, and improving quality of a decoded image.

In an embodiment, the determining an MVP corresponding to each to-be-decoded block includes: determining, for a current to-be-decoded block in a process of processing each to-be-decoded block in the to-be-decoded video frame, a reference frame in which a reference block corresponding to the current to-be-decoded block is located; determining, in the reference frame, an image block corresponding to the current to-be-decoded block with respect to an image location; and using an MV corresponding to the image block as an MVP of the current to-be-decoded block.

The reference frame is a video frame to which reference needs to be made when the to-be-encoded video frame is decoded, which is the same as a video frame to which reference is made in a corresponding encoding process. It may be understood that, the reference frame is a video frame obtained by reconstructing a previous to-be-decoded video frame. The to-be-decoded video frame may have one or more reference frames.

Specifically, after obtaining the reference frame of the to-be-decoded video frame according to the reference relationship during encoding, when decoding each to-be-decoded block in the to-be-decoded video frame with reference to the reference frame, for a current to-be-decoded block, the computer device may search the reference frame for a reference block that matches the current to-be-decoded block. After the reference block that matches the current to-be-decoded block is found, a reference frame in which the reference block is located is further determined.

Further, the computer device may determine, in the determined reference frame, an image block corresponding to the current to-be-decoded block with respect to an image location, and obtain an MV corresponding to the image block as an MVP of the current to-be-decoded block. The corresponding with respect to an image location may be specifically corresponding with respect to an image pixel or corresponding with respect to image coordinates.

It may be understood that, because the reference frame is a video frame decoded and reconstructed before the current to-be-decoded video frame, if the corresponding reference frame has an MV corresponding to the image block and at the resolution of the current to-be-decoded video frame, that is, in a scenario in the foregoing embodiment in which the resolution corresponding to the MVP of the to-be-decoded block is consistent with the resolution of the current to-be-decoded video frame, a processing manner in the scenario in the foregoing embodiment may be reused. If the corresponding reference frame does not have an MV corresponding to the image block and at the resolution of the current to-be-decoded video frame, that is, in a scenario in the foregoing embodiment in which the resolution corresponding to the MVP of the to-be-decoded block is inconsistent with the resolution of the current to-be-decoded video frame, a processing manner in the scenario in the foregoing embodiment may be reused.

In an embodiment, whether the corresponding reference frame has an MV corresponding to the image block and at the resolution of the current to-be-decoded video frame is related to a resolution of the reference frame.

In an embodiment, the using an MV corresponding to the image block as an MVP of the current to-be-decoded block includes: obtaining an MV corresponding to the image block at the resolution of the reference frame; and transforming the MV corresponding to the image block to an MV at the resolution of the to-be-decoded video frame in a case that the resolution of the reference frame is inconsistent with the resolution of the to-be-decoded video frame, to obtain the MVP of the current to-be-decoded block.

It may be understood that, the resolution of the to-be-decoded video frame is consistent with a resolution of a corresponding to-be-encoded video frame. However, the resolution of the reference frame may be inconsistent with the resolution of the to-be-encoded video frame. Therefore, when the resolution of the reference frame is inconsistent with the resolution of the to-be-decoded video frame, the MV corresponding to the image block at the resolution of the reference frame is obtained. The MV corresponding to the image block is transformed to the MV at the resolution of the to-be-decoded video frame. It may be understood that, a resolution corresponding to the transformed MV corresponding to the image block is the resolution of the to-be-decoded video frame, and the transformed MV corresponding to the image block may be directly used as the MVP of the current to-be-decoded block.

In the foregoing embodiment, the MV of the image block in the reference frame is used as the MVP of the to-be-decoded block in the current to-be-decoded video frame, to obtain the MV of the to-be-decoded block, which ensures smooth decoding and decoding quality.

In an embodiment, the computer device at the decoding side may compare the resolution represented by the resolution information of the to-be-decoded video frame with the target resolution represented by the resolution configuration information.

Specifically, when the resolution represented by the resolution information of the to-be-decoded video frame is consistent with the target resolution, it indicates that the MVD in the encoded data is at the resolution represented by the resolution information of the to-be-decoded video frame. Therefore, in the process of processing each to-be-decoded block in the to-be-decoded video frame, for the current to-be-decoded block, the MVP of the current to-be-decoded block is adjusted to the resolution represented by the resolution information of the to-be-decoded video frame, so that the MVP and the MVD are at the same resolution. Then the MVP and the MVD at the same resolution are added up to obtain the MV corresponding to the current to-be-decoded block and at the resolution of the to-be-decoded video frame.

When the resolution represented by the resolution information of the to-be-decoded video frame is inconsistent with the target resolution, the computer device may further compare the resolution represented by the resolution information of the to-be-decoded video frame with the resolution corresponding to the MVP of the current to-be-decoded block.

In an embodiment, the processing the MVD and the MVP corresponding to each to-be-decoded block at the same resolution in a case that a resolution of the to-be-decoded video frame is inconsistent with the target resolution, to obtain an MV corresponding to the corresponding to-be-decoded block and at the resolution of the to-be-decoded video frame includes: transforming, for a current to-be-decoded block in a process of processing each to-be-decoded block in the to-be-decoded video frame, an MVD corresponding to the current to-be-decoded block to a target MVD at the resolution of the to-be-decoded video frame in a case that an MVP corresponding to the current to-be-decoded block corresponds to the resolution of the to-be-decoded video frame; and obtaining an MV corresponding to the current to-be-decoded block and at the resolution of the to-be-decoded video frame according to the target MVD and the MVP corresponding to the current to-be-decoded block.

Specifically, when the resolution represented by the resolution information of the to-be-decoded video frame is inconsistent with the target resolution corresponding to the resolution configuration information agreed in advance, and the resolution represented by the resolution information of the to-be-decoded video frame is consistent with the resolution corresponding to the MVP of the current to-be-decoded block, the computer device at the decoding side transforms the MVD corresponding to the current to-be-decoded block to a target MVD at the resolution of the to-be-decoded video frame; and obtains, according to the target MVD and the MVP corresponding to the current to-be-decoded block, an MV corresponding to the current to-be-decoded block and at the resolution of the to-be-decoded video frame.

When the resolution represented by the resolution information of the to-be-decoded video frame is inconsistent with the resolution corresponding to the MVP of the current to-be-decoded block, the computer device may further compare the resolution corresponding to the MVP of the current to-be-decoded block with the target resolution corresponding to the resolution configuration information agreed with the encoding side in advance.

In an embodiment, the processing the MVD and the MVP corresponding to each to-be-decoded block at the same resolution in a case that a resolution of the to-be-decoded video frame is inconsistent with the target resolution, to obtain an MV corresponding to the corresponding to-be-decoded block and at the resolution of the to-be-decoded video frame includes: obtaining, for a current to-be-decoded block in a process of processing each to-be-decoded block in the to-be-decoded video frame, an initial MV corresponding to the current to-be-decoded block according to an MVD and an MVP corresponding to the current to-be-decoded block in a case that the MVP corresponding to the current to-be-decoded block does not correspond to the resolution of the to-be-decoded video frame but corresponds to the target resolution; and transforming the initial MV to an MV at the resolution of the to-be-decoded video frame.

Specifically, when the resolution represented by the resolution information of the to-be-decoded video frame is inconsistent with the target resolution corresponding to the resolution configuration information agreed in advance, the resolution represented by the resolution information of the to-be-decoded video frame is inconsistent with the resolution corresponding to the MVP of the current to-be-decoded block, and the resolution corresponding to the MVP of the current to-be-decoded block is consistent with the target resolution, the computer device at the decoding side obtains the initial MV corresponding to the current to-be-decoded block according to the MVD and the MVP corresponding to the current to-be-decoded block; and transforms the initial MV corresponding to the current to-be-decoded block to the MV at the resolution of the to-be-decoded video frame.

In an embodiment, the video decoding method further includes: respectively transforming, for a current to-be-decoded block, an MVD and an MVP corresponding to the current to-be-decoded block to a target MVD and a target MVP at the resolution of the to-be-decoded video frame in a case that the MVP corresponding to the current to-be-decoded block does not correspond to the resolution of the to-be-decoded video frame and does not correspond to the target resolution; and obtaining, according to the target MVD and the target MVP, an MV corresponding to the current to-be-decoded block and at the resolution of the to-be-decoded video frame.

Specifically, when the resolution represented by the resolution information of the to-be-decoded video frame is inconsistent with the target resolution corresponding to the resolution configuration information, and the resolution corresponding to the MVP corresponding to the current to-be-decoded block is inconsistent with the resolution represented by the resolution information of the to-be-decoded video frame and the target resolution, the computer device at the decoding side may respectively transform the MVD and the MVP corresponding to the current to-be-decoded block to the target MVD and the target MVP at the resolution of the to-be-decoded video frame; and obtain, according to the target MVD and the target MVP, the MV corresponding to the current to-be-decoded block and at the resolution of the to-be-decoded video frame.

In the foregoing embodiment, approaches to calculating an MV in different scenarios are provided, thereby ensuring that the calculated MV is at the resolution of the current to-be-decoded video frame, and achieving high accuracy.

In an embodiment, the target resolution is a resolution of an original video frame corresponding to the encoded data or the resolution of the to-be-decoded video frame. It may be understood that, the resolution of the original video frame is an original resolution, and the resolution of the to-be-decoded video frame is a current resolution of the to-be-decoded video frame.

In an embodiment, a video decoding method is provided. The method may specifically include: obtaining encoded data corresponding to a to-be-decoded video frame; obtaining resolution information corresponding to the to-be-decoded video frame; and decoding the encoded data according to the resolution information corresponding to the to-be-decoded video frame, to obtain a reconstructed video frame corresponding to the to-be-decoded video frame. It may be understood that, in an embodiment, steps S1204 to S1212 are included in the step of decoding the encoded data according to the resolution information corresponding to the to-be-decoded video frame, to obtain a reconstructed video frame corresponding to the to-be-decoded video frame.

The to-be-decoded video frame is a video frame that needs to be decoded. One to-be-decoded video frame sequence may include a plurality of to-be-decoded video frames. The to-be-decoded video frame may be a video frame obtained in real time, or may be a video frame obtained from a pre-stored to-be-decoded video frame sequence.

The resolution information is information related to a resolution, which may be the resolution, or may be a down-sampling ratio. The resolution information corresponding to the to-be-decoded video frame may be obtained from the encoded data, or may be obtained by a decoding device through calculation.

In an embodiment, the encoded data may carry the resolution information corresponding to the to-be-decoded video frame, for example, may carry a resolution or a down-sampling ratio corresponding to the to-be-decoded video frame.

In an embodiment, the encoded data may carry processing manner information, and the decoding device obtains the processing manner information from the encoded data, and obtains the resolution information corresponding to the to-be-decoded video frame according to the processing manner information. For example, the encoded data may carry processing manner information corresponding to a down-sampling processing manner. If it is determined in a codec standard that all down-sampling ratios are ½ or the encoded data carries a corresponding down-sampling ratio, the obtained resolution information is the down-sampling ratio of 1/2.

The reconstructed video frame is a video frame obtained through decoding and reconstruction. It may be understood that, resolution information corresponding to the reconstructed video frame corresponds to resolution information of a to-be-encoded video frame in an encoding process. If no image information is lost in the encoding process, the reconstructed video frame and the to-be-encoded video frame are the same. If image information is lost in the encoding process, a difference between the reconstructed video frame and the to-be-encoded video frame corresponds to a loss value. The encoded data is decoded based on the resolution information corresponding to the to-be-decoded video frame. The decoding may include at least one of prediction, inverse transformation, dequantization, and entropy decoding, which is specifically determined according to the encoding process. During the decoding, at least one of a reference frame, location information corresponding to each to-be-decoded block of the to-be-decoded video frame, location information of each reference block of the reference frame, and an MV is processed according to the resolution information of the to-be-decoded video frame. A processing method matches a processing method used to perform encoding at an encoding side. For example, a reference frame corresponding to the to-be-decoded video frame may be obtained, the reference frame is processed according to the resolution information corresponding to the to-be-decoded video frame, a target reference block in the processed reference frame is determined according to MV information carried in the encoded data, and the encoded data is decoded based on the target reference block to obtain the reconstructed video frame. In an embodiment, the computer device may obtain a predicted pixel value corresponding to the to-be-decoded block according to the target reference block, and obtain the reconstructed video frame according to a pixel residual in the encoded data and the predicted pixel value. The MV information is information related to an MV. In an embodiment, the MV information may include a target MV or an MVD.

In an embodiment, if the encoding side transforms location information, when corresponding location information is obtained in the decoding process, the location information needs to be transformed correspondingly, to maintain consistency between target reference blocks obtained at the encoding side and the decoding side.

In an embodiment, when the MV information carried in the encoded data is a target MV, the target MV may be transformed according to target MV resolution information and the resolution information corresponding to the to-be-decoded video frame, to obtain an MV corresponding to the resolution information corresponding to the to-be-decoded video frame, and a reference block corresponding to the to-be-decoded block is positioned in the reference frame according to the MV.

In an embodiment, when the MV information carried in the encoded data is an MVD, the MVP corresponding to the current to-be-decoded block is obtained, the MVD and the MVP corresponding to each to-be-decoded block are processed at the same resolution, to obtain an MV corresponding to the corresponding to-be-decoded block and at the resolution corresponding to the to-be-decoded video frame, and a reference block corresponding to each to-be-decoded block is positioned in the reference frame according to the MV.

Specifically, the processing the MVD and the MVP corresponding to each to-be-decoded block at the same resolution means transforming the MVD and the MVP to the same resolution for calculation. For example, the MVD and the MVP are made to both correspond to the target resolution, that is, the MVP is transformed to an MVP at the target resolution, so that an MV may be obtained according to the transformed MVP and the MVD, and then the MV is transformed to an MV at the resolution of the to-be-decoded video frame. For another example, the MVD and the MVP are made to both correspond to the resolution of the to-be-decoded video frame, that is, the MVP is transformed to an MVP at the resolution of the to-be-decoded video frame, and the MVD is transformed to an MVD at the resolution of the to-be-decoded video frame, so that an MV at the resolution of the to-be-decoded video frame may be obtained according to the transformed MVD and the transformed MVP.

In an embodiment, the method further includes: processing the reconstructed video frame according to the resolution information corresponding to the to-be-decoded video frame, to obtain a corresponding decoded video frame.

Specifically, the processing of the reconstructed video frame may be sampling, for example, up-sampling. A method for processing a reconstructed video frame may correspond to a method for processing an original video frame during encoding. For example, when a processing manner of an original video frame is the down-sampling processing manner, and resolution information is a down-sampling ratio of 1/2, a reconstructed video frame is up-sampled, and an up-sampling ratio may be 2.

In an embodiment, when the decoding side determines, from header information of the encoded data, that the encoded data is obtained through encoding in the down-sampling processing manner, the decoding side may further obtain used down-sampling ratio information or down-sampling method information from the header information, and up-sample the obtained reconstructed video frame by using an up-sampling ratio or an up-sampling method that matches the down-sampling ratio information or the down-sampling method information, to obtain a decoded video frame. For example, if the down-sampling ratio information corresponds to a sampling ratio of 1/2, the decoding side needs to up-sample the reconstructed video frame according to the sampling ratio of 2 and an up-sampling method that matches the down-sampling method information, to obtain a decoded video frame. The decoding side may obtain down-sampling ratio information or down-sampling method information corresponding to current encoded data from any one of sequence-level header information, GOP-level header information, and frame-level header information.

In the foregoing video decoding method, the encoded data corresponding to the to-be-decoded video frame is obtained, the resolution information corresponding to the to-be-decoded video frame is obtained, the encoded data is decoded according to the resolution information corresponding to the to-be-decoded video frame, to obtain the reconstructed video frame corresponding to the to-be-decoded video frame, and the reconstructed video frame is processed according to the resolution information corresponding to the to-be-decoded video frame, to obtain the corresponding decoded video frame. Therefore, during decoding, the decoding may be flexibly performed according to the resolution information corresponding to the to-be-decoded video frame to obtain the decoded video frame, and the obtained decoded video frame can be accurate as the decoding is performed at the resolution of the to-be-decoded video frame.

In an embodiment, all reconstructed video frames corresponding to to-be-decoded video frames of a to-be-decoded video frame sequence are processed to have the same resolution. For example, a reconstructed video frame is processed into a decoded video frame having a resolution the same as an original resolution of an original video frame.

In an embodiment, the decoding the encoded data according to the resolution information corresponding to the to-be-decoded video frame, to obtain a reconstructed video frame corresponding to the to-be-decoded video frame includes: obtaining a reference frame corresponding to the to-be-decoded video frame; and decoding the encoded data according to the resolution information corresponding to the to-be-decoded video frame and the reference frame, to obtain the reconstructed video frame corresponding to the to-be-decoded video frame.

Specifically, the to-be-decoded video frame may correspond to one or more reference frames. For example, the to-be-decoded video frame is a P frame, and corresponds to one reference frame. The to-be-decoded video frame is a B frame, and corresponds to two reference frames. The reference frame corresponding to the to-be-decoded video frame may be obtained according to a reference relationship, which may vary according to video codec standards. For example, for the second video frame in a GOP, which is a B frame, a corresponding reference frame may be an I frame in the GOP and the fourth frame in the GOP. Alternatively, the reference frame corresponding to the to-be-decoded video frame may be one or two of forward decoded video frames of the to-be-decoded video frame. It may be understood that, the reference frame is consistent with a reference frame in the encoding process.

In an embodiment, the obtaining a reference frame corresponding to the to-be-decoded video frame includes: obtaining a second reference rule, the second reference rule including a resolution relationship between the to-be-decoded video frame and the reference frame; and obtaining the reference frame corresponding to the to-be-decoded video frame according to the second reference rule.

Specifically, the second reference rule defines the resolution relationship between the to-be-decoded video frame and the reference frame. It may be understood that, to ensure consistency between the reference frame obtained in the encoding process and the reference frame obtained in the decoding process, the first reference rule is consistent with the second reference rule. The first reference rule and the second reference rule may be preset in a codec standard. Alternatively, during encoding, the first reference rule may be selected according to an application scenario, a real-time performance requirement, and the like of the encoding, and reference rule information is added to the encoded data; and the decoder obtains the second reference rule according to the reference rule information in the encoded data. The resolution relationship includes resolutions of the to-be-decoded video frame and the reference frame being the same or being different.

When the second reference rule includes the resolutions of the to-be-decoded video frame and the reference frame being the same, the second reference rule may further include a processing manner reference rule for the resolutions of the to-be-decoded video frame and the reference frame. For example, the processing manner reference rule may include one or both of the following: reference may be made to a reference frame in the full resolution processing manner for a to-be-decoded video frame in the full resolution processing manner, and reference may be made to a reference frame in the down-sampling processing manner for a to-be-decoded video frame in the down-sampling processing manner. When the second reference rule includes the resolutions of the to-be-decoded video frame and the reference frame being different, the second reference rule may further include the resolution of the to-be-decoded video frame being greater than the resolution of the reference frame, or the resolution of the to-be-decoded video frame being less than the resolution of the reference frame. Therefore, the second reference rule may include one or more of reference being made to a reference frame at a down-sampling resolution for a to-be-decoded video frame at an original resolution, reference being made to a reference frame at an original resolution for a to-be-decoded video frame at a down-sampling resolution, reference being made to a reference frame at an original resolution for a to-be-decoded video frame at an original resolution, and reference being made to a reference frame at a down-sampling resolution for a to-be-decoded video frame at a down-sampling resolution.

The to-be-decoded video frame at an original resolution means that a resolution of the to-be-decoded video frame is the same as a resolution of a corresponding original video frame. The reference frame at an original resolution means that a resolution of the reference frame is the same as a resolution of an original video frame corresponding to the reference frame. The to-be-decoded video frame at a down-sampling resolution means that resolution information corresponding to the to-be-decoded video frame is down-sampling. The reference frame at a down-sampling resolution means that resolution information corresponding to the reference frame is down-sampling. After the second reference rule is obtained, the reference frame corresponding to the to-be-decoded video frame is obtained according to the second reference rule, the obtained reference frame meeting the second reference rule.

Specifically, a reference block corresponding to the to-be-decoded block of the to-be-decoded video frame may be obtained from the reference frame, and the to-be-decoded block is decoded according to the reference block. Alternatively, the reference frame may be processed according to the resolution information of the to-be-decoded video frame, a target reference block corresponding to the to-be-decoded block of the to-be-decoded video frame is obtained from the processed reference frame, and the to-be-decoded block is decoded according to the target reference block, to obtain the reconstructed video frame corresponding to the to-be-decoded video frame.

In an embodiment, the decoding the encoded data according to the resolution information corresponding to the to-be-decoded video frame and the reference frame, to obtain a reconstructed video frame corresponding to the to-be-decoded video frame includes: sampling the reference frame according to the resolution information corresponding to the to-be-decoded video frame; and decoding the to-be-decoded video frame according to the sampled reference frame, to obtain the reconstructed video frame corresponding to the to-be-decoded video frame.

Specifically, a target reference block is obtained from the sampled reference frame according to the carried MV information, a predicted pixel value corresponding to the to-be-decoded block is obtained according to the target reference block, and the reconstructed video frame is obtained according to a pixel residual in the encoded data and the predicted pixel value.

In an embodiment, the sampling the reference frame according to the resolution information corresponding to the to-be-decoded video frame includes: sampling the reference frame according to the resolution information of the to-be-decoded video frame and a motion estimation pixel precision.

In an embodiment, the sampling the reference frame according to the resolution information of the to-be-decoded video frame and a motion estimation pixel precision includes: obtaining a pixel interpolation precision through calculation according to the resolution information of the to-be-decoded video frame and the motion estimation pixel precision; and directly performing fractional pixel interpolation processing on the reference frame according to the pixel interpolation precision.

In an embodiment, the sampling the reference frame according to the resolution information of the to-be-decoded video frame and a motion estimation pixel precision includes: sampling the reference frame according to the resolution information of the to-be-decoded video frame to obtain an intermediate reference frame; and performing fractional pixel interpolation processing on the intermediate reference frame according to the motion estimation pixel precision.

It may be understood that, the computer device may decode the to-be-decoded video frame according to the reference frame on which the fractional pixel interpolation processing is performed, to obtain the reconstructed video frame corresponding to the to-be-decoded video frame.

Specifically, resolutions of the to-be-decoded video frame and the to-be-encoded video frame are consistent, and obtained target reference frames are also consistent. Therefore, a method for sampling the reference frame according to the resolution information corresponding to the to-be-decoded video frame is consistent with a method for sampling the reference frame according to the resolution information of the to-be-encoded video frame at the encoding side, which is not described in detail again herein.

In an embodiment, the decoding side may further obtain sampling manner information corresponding to the to-be-decoded video frame from the header information of the encoded data. Specifically, fractional pixel interpolation manner information corresponding to the to-be-decoded video frame may be obtained from any one of sequence-level header information, GOP-level header information, and frame-level header information. For example, when a flag Pixel_Sourse_Interpolation in the frame-level header information of the encoded data and used for determining a sampling manner is 0, it indicates that direct fractional pixel interpolation processing is performed on the reference frame corresponding to the original video frame. When Pixel_Sourse_Interpolation is 1, it indicates that the reference frame corresponding to the original video frame is sampled and then fractional pixel interpolation processing is performed. The decoding side may perform fractional pixel interpolation processing on the reference frame in the same manner as the fractional pixel interpolation manner indicated by the flag in the encoded data, and then may decode the encoded data according to a reference frame obtained after the fractional pixel interpolation processing to obtain a reconstructed video frame.

In an embodiment, the encoding side encodes an MV during the encoding. Therefore, the decoding the encoded data according to the resolution information corresponding to the to-be-decoded video frame and the reference frame, to obtain a reconstructed video frame corresponding to the to-be-decoded video frame includes: determining a coordinate inverse transformation parameter according to the resolution information corresponding to the to-be-decoded video frame and resolution information of the reference frame; obtaining an MV corresponding to each to-be-decoded block in the to-be-decoded video frame according to the encoded data; then obtaining a reference block corresponding to each to-be-decoded block in the to-be-decoded video frame according to the coordinate inverse transformation parameter and each MV; and decoding the encoded data according to each reference block, to obtain the reconstructed video frame corresponding to the to-be-decoded video frame.

The coordinate inverse transformation parameter is used for transforming an MV or location information for obtaining the MV. The coordinate inverse transformation parameter may be a ratio of the resolution information of the reference frame to the resolution information of the to-be-decoded video frame. The coordinate inverse transformation parameter corresponds to a coordinate transformation parameter for calculating and adjusting an MV during encoding. When the MV is transformed by using the coordinate inverse transformation parameter, if the MV may be transformed to the resolution corresponding to the to-be-decoded video frame, the coordinate inverse transformation parameter may be a reciprocal of the coordinate transformation parameter. When the location information corresponding to the MV is transformed by using the coordinate inverse transformation parameter, if the coordinate transformation parameter at the encoding side is used for transforming first location information, because location information of the to-be-decoded block and the to-be-encoded block is the same, the coordinate inverse transformation parameter is the same as the coordinate transformation parameter. If the coordinate transformation parameter at the encoding side is used for transforming second location information, because a location value obtained through calculation according to the MV and the first location information is a location value obtained at the encoding side by transforming the second location information according to the coordinate transformation parameter, the coordinate inverse transformation parameter is a reciprocal of the coordinate transformation parameter.

Specifically, after obtaining the coordinate inverse transformation parameter, the computer device transforms the obtained MV or location information corresponding to the MV according to the coordinate inverse transformation parameter, to obtain location information corresponding to a reference block, to obtain the reference block. After the reference block is obtained, a pixel value of each image block of the reconstructed video frame is obtained according to a pixel value of the reference block and the pixel residual, carried in the encoded data, of the to-be-decoded block to obtain the reconstructed video frame.

In an embodiment, the obtaining a reference block corresponding to each to-be-decoded block in the to-be-decoded video frame according to the coordinate inverse transformation parameter and each MV includes: obtaining first location information corresponding to a current to-be-decoded block; and obtaining a reference block corresponding to the current to-be-decoded block according to the first location information, the coordinate inverse transformation parameter, and an MV.

For example, the resolution of the to-be-decoded video frame is 1200*1200 pixels, and the resolution of the reference frame is 600*600 pixels. The coordinate transformation parameter is used for transforming second location information, and the coordinate transformation parameter is 2. Therefore, the coordinate inverse transformation parameter is ½. Assuming that first location information is (6, 8), and an MV is (0, 2), intermediate location information is (6, 8)−(0, 2)=(6, 6), and second location information corresponding to a reference block is (6*½, 6*½)=(3, 3).

For another example, the resolution of the to-be-decoded video frame is 1200*1200 pixels, and the resolution of the reference frame is 600*600 pixels. The coordinate transformation parameter is used for transforming first location information, and the coordinate transformation parameter is ½. Therefore, the coordinate inverse transformation parameter is ½. Assuming that first location information is (6, 8), and an MV is (0, 1), second location information is (6*½, 8*½)−(0, 1)=(3, 3).

In an embodiment, a proportion of a to-be-decoded block of a target prediction type in a forward decoded video frame corresponding to the to-be-decoded video frame may be further calculated; a processing manner corresponding to the to-be-decoded video frame is determined according to the proportion; and the resolution information corresponding to the to-be-decoded video frame is obtained in the processing manner.

Specifically, the to-be-decoded block of the target prediction type corresponds to a to-be-encoded block of the target prediction type. The forward decoded video frame is a video frame decoded before the to-be-decoded video frame, and the forward decoded video frame also corresponds to a forward coded video frame. Therefore, a calculation method and result of obtaining a proportion of the to-be-encoded block of the target prediction type at the encoding side are consistent with those of obtaining a proportion of the to-be-decoded block of the target prediction type at the decoding side. For the method for obtaining the proportion of the to-be-decoded block of the target prediction type, reference may be made to the method for obtaining the proportion of the to-be-encoded block of the target prediction type. Details are not described herein again. After the processing manner is obtained, when the processing manner is the full resolution processing manner, corresponding resolution information is an original resolution. When the processing manner is the down-sampling processing manner, a preset down-sampling ratio is obtained or a down-sampling ratio is obtained from the header information of the encoded data.

In an embodiment, a proportion of an intra-decoded block in a forward decoded video frame to the forward decoded video frame may be calculated, and when the proportion is greater than a target threshold, it is determined that the processing manner is the down-sampling processing manner.

For the proportion corresponding to the intra-decoded block, when the proportion is greater than the target threshold, it may be determined that the processing manner corresponding to the to-be-decoded video frame is the down-sampling processing manner. Otherwise, it is determined that the processing manner corresponding to the video frame is the full resolution processing manner For example, when the proportion is greater than the target threshold, it is determined that the processing manner corresponding to the to-be-decoded video frame is the down-sampling processing manner. Otherwise, it is determined that the processing manner corresponding to the video frame is the full resolution processing manner The target threshold may be determined according to a processing manner of the reference frame corresponding to the to-be-decoded video frame. When the processing manner of the reference frame corresponding to the to-be-decoded video frame is the down-sampling processing manner, a first preset threshold T1 is obtained as the target threshold. Similarly, when the processing manner of the reference frame corresponding to the to-be-decoded video frame is the full resolution processing manner, a second preset threshold T2 is obtained as the target threshold. Further, after the target threshold is obtained according to the resolution information of the reference frame corresponding to the to-be-decoded video frame, the processing manner of the to-be-decoded video frame is determined according to the target threshold and the proportion of the intra-decoded block in the forward decoded video frame to the forward decoded video frame. When the proportion of the intra-decoded block in the forward decoded video frame to the forward decoded video frame is greater than the target threshold, it is determined that the processing manner corresponding to the to-be-decoded video frame is the downsampling processing manner.

In an embodiment, before the obtaining encoded data corresponding to a to-be-decoded video frame, the method further includes: obtaining a to-be-decoded video frame sequence corresponding to the to-be-decoded video frame, and obtaining a video frame sequence decoding mode corresponding to the to-be-decoded video frame sequence, the video frame sequence decoding mode including a constant resolution decoding mode or a mixed resolution decoding mode; when the video frame sequence decoding mode is the mixed resolution decoding mode, performing mixed-resolution decoding on each to-be-decoded video frame of the to-be-decoded video frame sequence; and when the video frame sequence decoding mode is the constant resolution decoding mode, performing constant resolution decoding on the to-be-decoded video frame sequence.

Specifically, video frame sequence encoding mode information may be obtained from the encoded data, and the video frame sequence decoding mode is obtained according to the video frame sequence encoding mode information. For example, when a video frame sequence encoding mode corresponding to the video frame sequence encoding mode information is the constant resolution encoding mode, the corresponding video frame sequence decoding mode is the constant resolution decoding mode. In the constant resolution decoding mode, resolutions of all the to-be-decoded video frames of the video frame sequence are consistent. When a video frame sequence encoding mode corresponding to the video frame sequence encoding mode information is the mixed resolution encoding mode, the corresponding video frame sequence decoding mode is the mixed resolution decoding mode.

In an embodiment, a decoding framework corresponding to the to-be-decoded video frame may be determined from the header information of the encoded data. Specifically, the decoding side may obtain, from sequence-level header information corresponding to the encoded data, an encoding framework used to encode each original video frame in an input video frame sequence corresponding to the current encoded data, to determine a decoding framework for the to-be-decoded video frame, which matches the encoding framework. For example, when a flag Sequence_Mix_Flag in the sequence-level header information of the encoded data and used for determining a used encoding framework is 0, it indicates that a constant resolution encoding framework is used to encode each original video frame in the input video frame sequence, and therefore, the decoding side may decode the encoded data by using a constant resolution decoding framework to obtain the reconstructed video frame corresponding to the to-be-decoded video frame. When Sequence_Mix_Flag is 1, it indicates that a mixed resolution encoding framework is used to encode each original video frame in the input video frame sequence, and therefore, the decoding side may decode the encoded data by using a mixed resolution decoding framework to obtain a reconstructed video frame sequence.

In an embodiment, the obtaining a video frame sequence decoding mode corresponding to the to-be-decoded video frame sequence may include: obtaining current environment information, the current environment information including at least one piece of information in current encoding environment information and current decoding environment information; and determining a target video frame sequence decoding mode corresponding to the to-be-decoded video frame sequence according to the current environment information.

Specifically, the decoding side may alternatively obtain a corresponding target video frame sequence decoding mode according to a method for obtaining a video frame sequence encoding mode at the encoding side. Therefore, in one embodiment of the present disclosure, determining a target video frame sequence decoding mode according to current environment information is consistent with determining a target video frame sequence encoding mode according to current environment information. Details are not described herein again.

In an embodiment, the current environment information includes an application scenario corresponding to the to-be-decoded video frame sequence, and the video frame sequence decoding mode corresponding to the to-be-decoded video frame sequence may be obtained according to the application scenario.

The video decoding method is described below by using an example of decoding the encoded data corresponding to a video frame sequence A. It is assumed that to-be-decoded video frames corresponding to the original video frames a, b, and c are e, f, and g at the decoding side, respectively.

1. The receiving terminal obtains the encoded data corresponding to the video frame sequence A, and obtains, from sequence header information corresponding to the encoded data, that a target video frame sequence encoding mode is the mixed resolution encoding mode. Therefore, the encoded data is decoded by using the mixed resolution decoding framework.

2. A resolution information obtaining unit of the mixed resolution decoding framework obtains resolution information corresponding to the first to-be-decoded video frame e. It may be understood that, encoded data corresponding to e is data obtained by encoding a1, and a1 is a video frame obtained after a is down-sampled by using a down-sampling ratio of 1/2. Intra-decoding is performed on e to obtain a reconstructed video frame e1. Because the resolution information corresponding to e is ½, the reconstructed video frame e1 may be up-sampled by using a sampling ratio of 2 to obtain a decoded video frame e2.

3. The resolution information obtaining unit of the mixed resolution decoding framework obtains resolution information corresponding to the second to-be-decoded video frame f. It may be understood that, encoded data corresponding to f is data obtained by encoding b1, and b1 is a video frame obtained after b is down-sampled by using a down-sampling ratio of 1/4. Inter-frame decoding is performed on f to obtain a reconstructed video frame f1. Because the resolution information corresponding to f is the down-sampling ratio of 1/4, the reconstructed video frame f1 may be up-sampled by using a sampling ratio of 4 to obtain a decoded video frame f2.

A decoding process is as follows: Because f is an interframe predicted frame, the reconstructed video frame e1 needs to be used as a reference frame. It may be understood that, e1 is the same as a2 mentioned in the description of the video encoding method, e1 is sampled in the same way as a2 to obtain e3, and e3 herein is the same as a3 (a3 is also mentioned in the description of the video encoding method). It is obtained, from the encoded data, that an MVD corresponding to a current to-be-decoded block is MVD1. Because MVD1 is at a target resolution, that is, an original resolution, MVD1 needs to be transformed to a resolution corresponding to f. Therefore, MVD3MVD1/4 may be obtained. An initial MV is MV2, which is obtained through calculation at a resolution corresponding to the down-sampling ratio of 1/4, and corresponds to the same resolution as f Therefore, a first MV MV1=MVD1/4+MV2 may be obtained. A target reference block is obtained according to MV1. A predicted pixel value corresponding to the to-be-decoded block is obtained according to the target reference block, and a reconstructed block corresponding to the reconstructed video frame f1 is obtained through reconstruction by adding up the pixel residual p1 and the predicted pixel value.

4. The resolution information obtaining unit of the mixed resolution decoding framework obtains encoded data corresponding to the third to-be-decoded video frame g. It may be understood that, the encoded data corresponding to g is data obtained by encoding c1, and c1 is a video frame obtained after c is down-sampled by using a down-sampling ratio of 1/8 (reference may be made to content in the description of the video encoding method). Intra-frame decoding is performed on g to obtain a reconstructed video frame g1. Because the resolution information corresponding to g is 1/8, the reconstructed video frame g1 may be up-sampled by using a sampling ratio of 8 to obtain a decoded video frame g2.

A decoding process is as follows: Because g is an interframe predicted frame, the reconstructed video frame f1 needs to be used as a reference frame. It may be understood that, f1 is the same as b2 mentioned in the description of the video encoding method, f1 is sampled in the same way as b2 to obtain f3, and f3 herein is the same as b3 (b3 is also mentioned in the description of the video encoding method). It is obtained, from the encoded data, that an MVD corresponding to a current to-be-decoded block is MVD2. Because MVD2 is at a target resolution, that is, an original resolution, MVD2 needs to be transformed to a resolution corresponding to g. Therefore, MVD2=MVD1/8 may be obtained. An initial MV is MV4, which is obtained through calculation at a resolution corresponding to the down-sampling ratio of 1/4, and needs to be transformed to the resolution corresponding to f. The down-sampling ratio corresponding to f is 1/8. Therefore, a first MV MV3=MVD2/8+MV4/2 may be obtained. A target reference block is obtained according to MV3. A predicted pixel value corresponding to the to-be-decoded block is obtained according to the target reference block, and a reconstructed block corresponding to the reconstructed video frame g1 is obtained through reconstruction by adding up the pixel residual p2 and the predicted pixel value.

5. The receiving terminal plays e2, f2, and g2.

Figure 13:
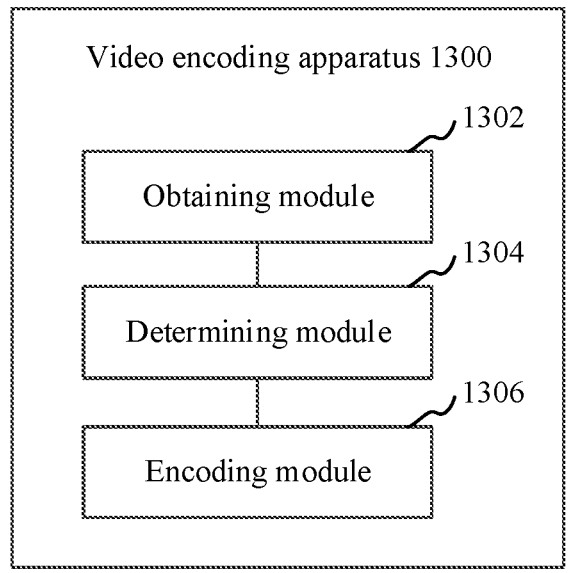
FIG. 13 is a block diagram of a video encoding apparatus according to an embodiment of the present disclosure.

As shown in FIG. 13, in an embodiment, a video encoding apparatus 1300 is provided. The video encoding apparatus 1300 has a function of implementing the video encoding method. The function may be implemented by hardware or by hardware executing corresponding software. The apparatus 1300 may be a computer device, or may be disposed in a computer device. The computer device may be a terminal or a server. The video encoding apparatus 1300 may include: an obtaining module 1302, a determining module 1304, and an encoding module 1306.

The obtaining module 1302 is configured to obtain a to-be-encoded video frame, different to-be-encoded video frames possibly having different resolutions; and determine target MV resolution information according to resolution configuration information of the to-be-encoded video frame.

The determining module 1304 is configured to determine a target MV corresponding to each to-be-encoded block in the to-be-encoded video frame at a target resolution represented by the target MV resolution information.

The obtaining module 1302 is further configured to obtain an MVP corresponding to each to-be-encoded block and at the target resolution.

The encoding module 1306 is configured to obtain encoded data according to an MVD between each target MV and the corresponding MVP.

In an embodiment, the determining module 1304 is further configured to determine an initial MV corresponding to each to-be-encoded block in the to-be-encoded video frame at a current resolution of the to-be-encoded video frame; and transform the initial MV to the target MV at the target resolution in a case that the current resolution is inconsistent with the target resolution represented by the target MV resolution information.

In an embodiment, the target resolution represented by the target MV resolution information is an original resolution of an original video frame corresponding to the to-be-encoded video frame. The determining module 1304 is further configured to transform the initial MV corresponding to each to-be-encoding block of the to-be-encoded video frame to the target MV at the original resolution in a case that the to-be-encoded video frame is obtained by processing the original video frame in a down-sampling processing manner.

In an embodiment, the determining module 1304 is further configured to determine a first vector transformation coefficient according to current resolution information of the to-be-encoded video frame and the target MV resolution information; and transform the initial MV to the target MV at the target resolution according to the first vector transformation coefficient.

In an embodiment, the obtaining module 1302 is further configured to determine, for a current to-be-encoded block in a process of encoding each to-be-encoded block in the to-be-encoded video frame, a reference frame in which a reference block corresponding to the current to-be-encoded block is located; determine, in the reference frame, an image block corresponding to the current to-be-encoded block with respect to an image location; and obtain a target MV corresponding to the image block and at the target resolution as an MVP of the current to-be-encoded block.

In an embodiment, the target resolution represented by the target MV resolution information is a current resolution of the to-be-encoded video frame; and the determining module 1304 is further configured to obtain an initial MV of the image block at a resolution of the reference frame in a case that the resolution of the reference frame is inconsistent with the current resolution; and transform the initial MV of the image block to the target MV at the current resolution as the MVP of the current to-be-encoded block.

In an embodiment, the determining module 1304 is further configured to determine a second vector transformation coefficient according to resolution information of the reference frame and the target MV resolution information; and transform, according to the second vector transformation coefficient, the initial MV of the image block to the target MV at the current resolution as the MVP of the current to-be-encoded block.

In an embodiment, the obtaining module 1302 is further configured to obtain the original video frame; obtain a processing manner corresponding to the original video frame; and process the original video frame in the processing manner, to obtain the to-be-encoded video frame, the processing manner being a full resolution processing manner or a down-sampling processing manner.

Figure 14:
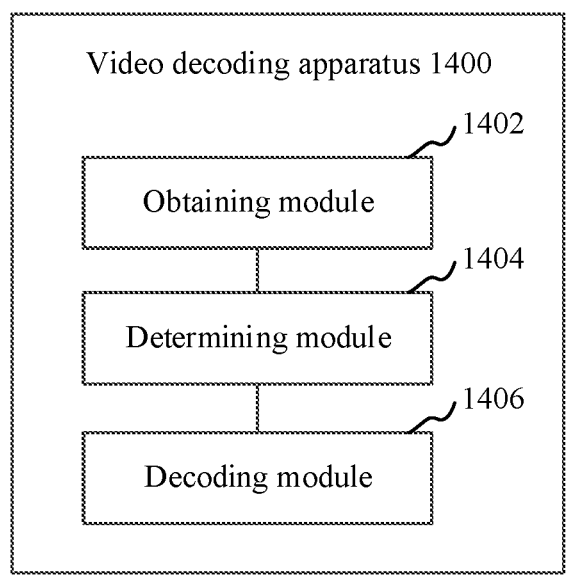
FIG. 14 is a block diagram of a video decoding apparatus according to an embodiment of the present disclosure.

As shown in FIG. 14, in an embodiment, a video decoding apparatus 1400 is provided. The video decoding apparatus 1400 has a function of implementing the video decoding method. The function may be implemented by hardware or by hardware executing corresponding software. The apparatus may be a computer device, or may be disposed in a computer device. The computer device may be a terminal or a server. The video decoding apparatus 1400 may include: an obtaining module 1402, a determining module 1404, and a decoding module 1406.

The obtaining module 1402 is configured to obtain encoded data corresponding to a to-be-decoded video frame; and extract an MVD corresponding to each to-be-decoded block in the to-be-decoded video frame in the encoded data, a resolution corresponding to the MVD being a target resolution corresponding to resolution configuration information.

The determining module 1404 is configured to determine an MVP corresponding to each to-be-decoded block; process the MVD and the MVP corresponding to each to-be-decoded block at the same resolution in a case that a resolution of the to-be-decoded video frame is inconsistent with the target resolution, to obtain an MV corresponding to the corresponding to-be-decoded block and at the resolution of the to-be-decoded video frame; and determine a reference block corresponding to each to-be-decoded block according to an MV corresponding to each to-be-decoded block.

The decoding module 1406 is configured to obtain a reconstructed video frame according to each reference block and the encoded data.

In an embodiment, the determining module 1404 is further configured to determine, for a current to-be-decoded block in a process of processing each to-be-decoded block in the to-be-decoded video frame, a reference frame in which a reference block corresponding to the current to-be-decoded block is located; determine, in the reference frame, an image block corresponding to the current to-be-decoded block with respect to an image location; and use an MV corresponding to the image block as an MVP of the current to-be-decoded block.

In an embodiment, the target resolution is a resolution of the to-be-decoded video frame. The determining module 1404 is further configured to obtain an MV corresponding to the image block at a resolution of the reference frame in a case that the resolution of the reference frame is inconsistent with the resolution of the to-be-decoded video frame; and transform the MV corresponding to the image block to an MV at the resolution of the to-be-decoded video frame, to obtain the MVP of the current to-be-decoded block.

In an embodiment, the determining module 1404 is further configured to transform, for a current to-be-decoded block in a process of processing each to-be-decoded block in the to-be-decoded video frame, an MVD corresponding to the current to-be-decoded block to a target MVD at the resolution of the to-be-decoded video frame in a case that an MVP corresponding to the current to-be-decoded block corresponds to the resolution of the to-be-decoded video frame; and obtain an MV corresponding to the current to-be-decoded block and at the resolution of the to-be-decoded video frame according to the target MVD and the MVP corresponding to the current to-be-decoded block.

In an embodiment, the determining module 1404 is further configured to obtain, for a current to-be-decoded block in a process of processing each to-be-decoded block in the to-be-decoded video frame, an initial MV corresponding to the current to-be-decoded block according to an MVD and an MVP corresponding to the current to-be-decoded block in a case that the MVP corresponding to the current to-be-decoded block does not correspond to the resolution of the to-be-decoded video frame but corresponds to the target resolution; and transform the initial MV to an MV at the resolution of the to-be-decoded video frame.

In an embodiment, the target resolution is a resolution of an original video frame corresponding to the encoded data or the resolution of the to-be-decoded video frame.

Figure 15:
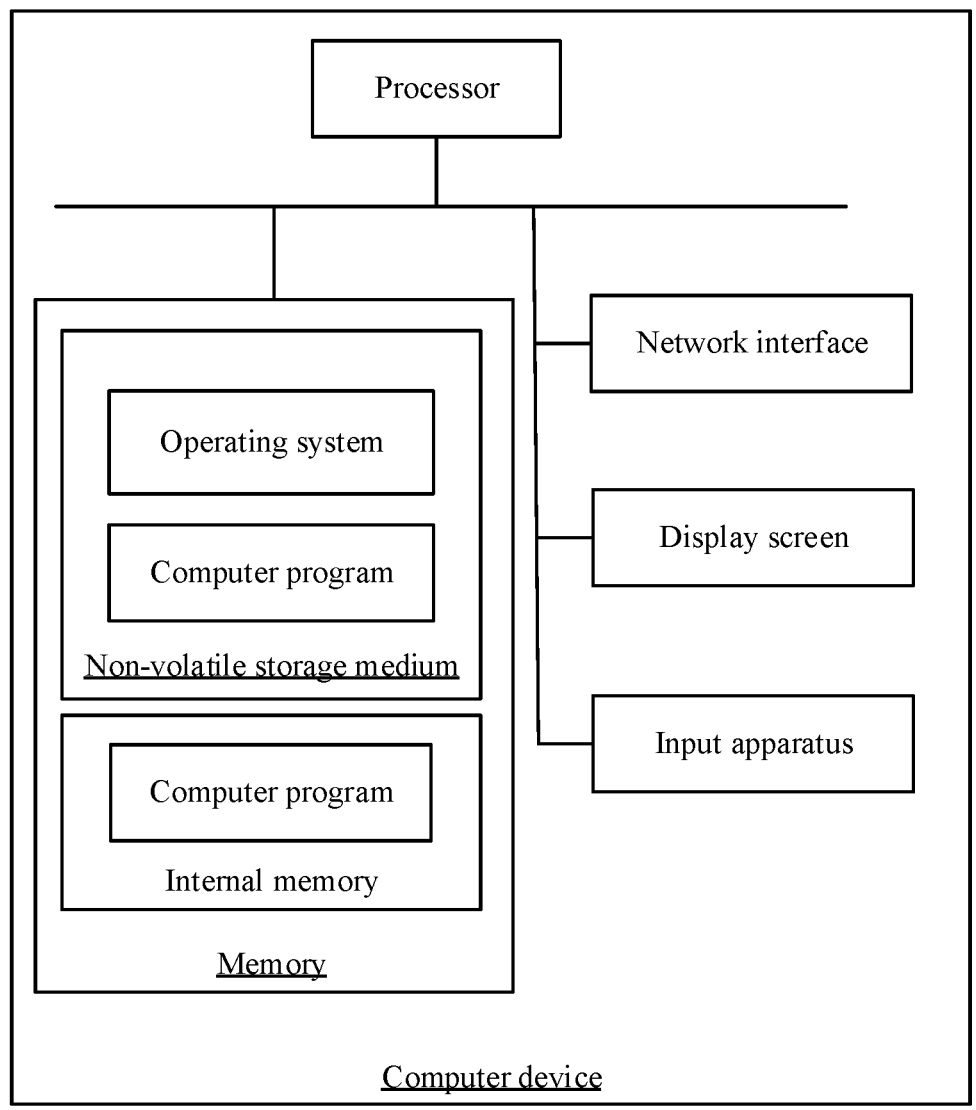
FIG. 15 is a block diagram of an internal structure of a computer device according to an embodiment of the present disclosure.

FIG. 15 is a diagram of an internal structure of a computer device according to an embodiment. The computer device may be specifically the terminal 110 in FIG. 1. As shown in FIG. 15, the computer device includes a processor, a memory, a network interface, an input apparatus and a display screen that are connected by using a system bus. The memory includes a non-volatile storage medium and an internal memory. The non-volatile storage medium of the computer device stores an operating system and may further store a computer program, the computer program, when executed by the processor, causing the processor to implement at least one of the video encoding method and the video decoding method. The internal memory may also store a computer program. When executed by the processor, the computer program may cause the processor to perform at least one of the video encoding method and the video decoding method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, mouse, or the like.

Figure 16:
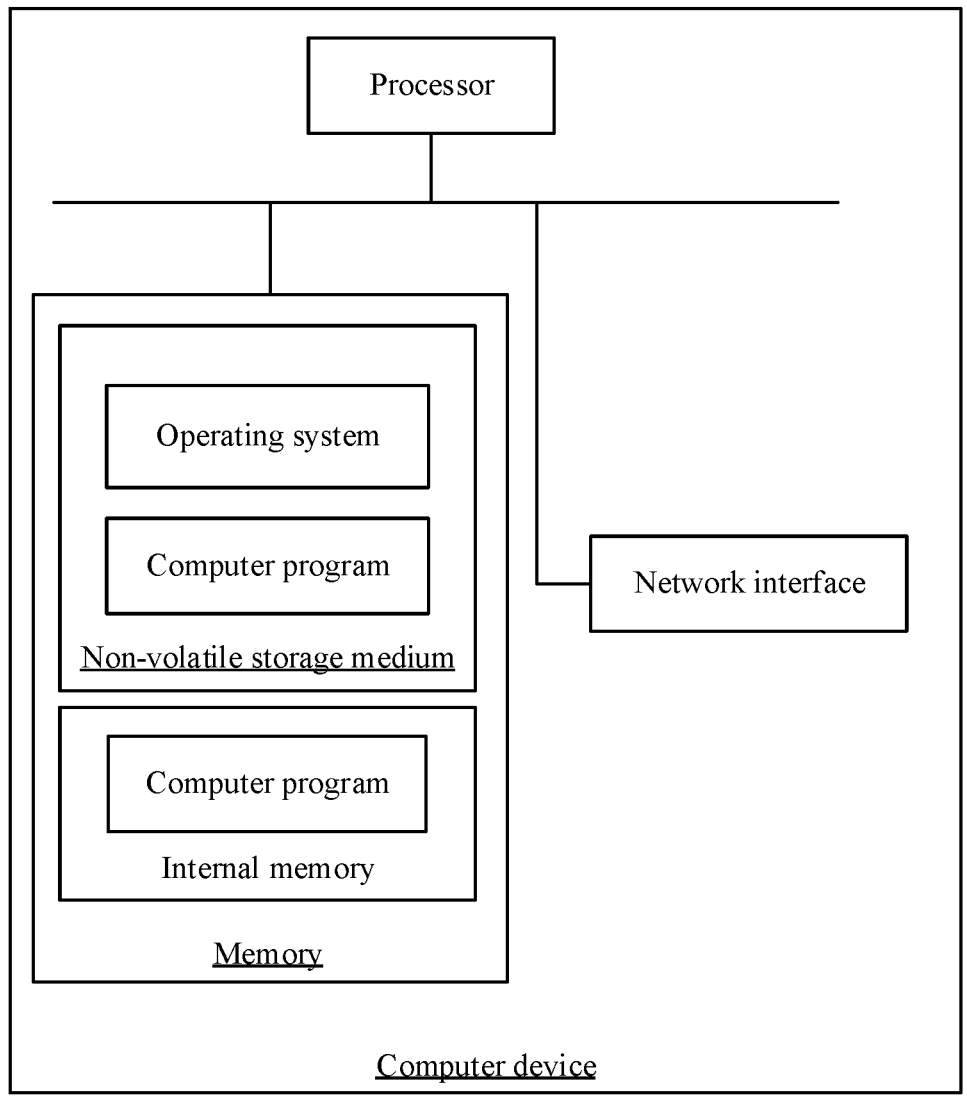
FIG. 16 is a block diagram of an internal structure of a computer device according to another embodiment of the present disclosure.

FIG. 16 is a diagram of an internal structure of a computer device according to an embodiment. The computer device may be specifically the server 120 in FIG. 1. As shown in FIG. 16, the computer device includes a processor, a memory, and a network interface that are connected by using a system bus. The memory includes a non-volatile storage medium and an internal memory. The non-volatile storage medium of the computer device stores an operating system and may further store a computer program, the computer program, when executed by the processor, causing the processor to implement at least one of the video encoding method and the video decoding method. The internal memory may also store a computer program. When executed by the processor, the computer program may cause the processor to perform at least one of the video encoding method and the video decoding method.

A person skilled in the art may understand that, the structures shown in FIG. 15 and FIG. 16 are only block diagrams of a part of a structure related to a solution of the present disclosure and does not limit the computer device to which the solution of the present disclosure is applied. Specifically, the computer device may include more or fewer members than those in the drawings, or include a combination of some members, or include different member layouts.

In an embodiment, the video encoding apparatus provided in the present disclosure may be implemented in a form of a computer program. The computer program may run on the computer device shown in FIG. 15 and FIG. 16. The memory of the computer device may store program modules forming the video encoding apparatus, for example, the obtaining module 1302, the determining module 1304, and the encoding module 1306 in the video encoding apparatus 1300 shown in FIG. 13. The computer program formed by the program modules causes the processor to perform steps in the video encoding method described in the embodiments of the present disclosure in this specification.

For example, the computer device shown in FIG. 15 and FIG. 16 may use the obtaining module 1302 in the video encoding apparatus 1300 shown in FIG. 13 to obtain a to-be-encoded video frame, different to-be-encoded video frames possibly having different resolutions; and determine target MV resolution information according to resolution configuration information of the to-be-encoded video frame. The computer device may use the determining module 1304 to determine a target MV corresponding to each to-be-encoded block in the to-be-encoded video frame at a target resolution represented by the target MV resolution information, and use the obtaining module 1302 to obtain an MVP corresponding to each to-be-encoded block and at the target resolution. The computer device may use the encoding module 1306 to obtain encoded data according to an MVD between each target MV and the corresponding MVP.

In an embodiment, the video decoding apparatus provided in the present disclosure may be implemented in a form of a computer program. The computer program may run on the computer device shown in FIG. 15 and FIG. 16. The memory of the computer device may store program modules forming the video decoding apparatus, for example, the obtaining module 1402, the determining module 1404, and the decoding module 1406 in the video decoding apparatus 1400 shown in FIG. 14. The computer program formed by the program modules causes the processor to perform steps in the video encoding method described in the embodiments of the present disclosure in this specification.

For example, the computer device shown in FIG. 15 and FIG. 16 may use the obtaining module 1402 in the video decoding apparatus 1400 shown in FIG. 14 to obtain encoded data corresponding to a to-be-decoded video frame; and extract an MVD corresponding to each to-be-decoded block in the to-be-decoded video frame in the encoded data, a resolution corresponding to the MVD being a target resolution corresponding to resolution configuration information. The computer device may use the determining module 1404 to determine an MVP corresponding to each to-be-decoded block; process the MVD and the MVP corresponding to each to-be-decoded block at the same resolution in a case that a resolution of the to-be-decoded video frame is inconsistent with the target resolution, to obtain an MV corresponding to the corresponding to-be-decoded block and at the resolution of the to-be-decoded video frame; and determine a reference block corresponding to each to-be-decoded block according to an MV corresponding to each to-be-decoded block. The computer device may use the decoding module 1406 to obtain a reconstructed video frame according to each reference block and the encoded data.

A computer device includes a memory and a processor, the memory storing a computer program, the computer program, when executed by the processor, causing the processor to perform the video encoding method or the video decoding method provided in the foregoing embodiment.

A storage medium stores a computer program, the computer program, when executed by a processor, causing the processor to perform the video encoding method or the video decoding method provided in the foregoing embodiment.

It is to be understood that, the steps of the embodiments of the present disclosure are not necessarily performed according to a sequence indicated by step numbers. Unless otherwise explicitly stated in this specification, these steps are not necessarily performed in a strictly limited order, and the steps may be performed in other orders. In addition, at least some of the steps in the embodiments may include a plurality of sub-steps or a plurality of stages. These sub-steps or stages are not necessarily performed at the same moment, but may be performed at different moments. These sub-steps or stages are not necessarily performed sequentially, but may be performed by turns or alternately with other steps or at least some sub-steps or stages of other steps.

A person of ordinary skill in the art may understand that all or some of the processes in the method of the foregoing embodiments may be implemented and completed by using the computer programs to instruct related hardware. The programs may be stored in a non-volatile computer-readable storage medium, and the programs, when executed, may include the processes of the foregoing method embodiments. Any reference to a memory, storage, database or another medium used in the various embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus (Rambus) direct RAM (RDRAM), a direct Rambus dynamic RAM (DRDRAM), and a Rambus dynamic RAM (RDRAM).

Accordingly, In the video encoding method and apparatus, the computer device, and the storage medium, when a to-be-encoded video frame having different resolutions is encoded, a target MV and an MVP corresponding to each to-be-encoded block in the to-be-encoded video frame are determined at a target resolution represented by target MV resolution information determined according to resolution configuration information. In this way, encoded data obtained according to an MVD between the target MV and the corresponding MVP at the same resolution is more accurate, thereby improving encoding quality. Moreover, obtaining the encoded data according to the MVD between the target MV and the corresponding MVP at the same resolution reduces a data amount of the encoded data. In addition, the video encoding method can be used to encode to-be-encoded video frames with different resolutions, which improves encoding flexibility.

In the video decoding method and apparatus, the computer device, and the storage medium, encoded data includes an MVD corresponding to each to-be-decoded block in a to-be-decoded video frame, a resolution corresponding to the MVD being a target resolution corresponding to resolution configuration information, and when a resolution of the to-be-decoded video frame is inconsistent with the target resolution, the MVD and an MVP corresponding to each to-be-decoded block are processed at the same resolution, to obtain an MV corresponding to each to-be-decoded block and at the resolution of the to-be-decoded video frame, so that the determined MV is more accurate, a reference block corresponding to each to-be-decoded block can be accurately found, and a reconstructed video frame obtained according to the accurate reference block and the encoded data is more accurate, thereby improving quality of a decoded image.

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only show several implementations of the present disclosure and are described in detail, but they are not to be construed as a limit to the patent scope of the present disclosure. A person of ordinary skill in the art may further make several variations and improvements without departing from the ideas of the present disclosure, and such variations and improvements fall within the protection scope of the present disclosure. Therefore, the protection scope of this patent application is subject to the protection scope of the appended claims.

What is claimed is:

1. A computer device, comprising:
a memory storing computer instructions, and a processor coupled to the memory, wherein the processor is configured, when executing the computer instructions, to perform:
obtaining encoded data corresponding to a current frame;
extracting a motion vector difference (MVD) corresponding to each block to be decoded in the current frame in the encoded data, a resolution corresponding to the MVD being a target resolution corresponding to a resolution configuration;
determining a motion vector prediction (MVP) corresponding to each block to be decoded;
processing the MVD and the MVP corresponding to each block to be decoded at a same resolution after determining that a resolution of the current frame is inconsistent with the target resolution, to obtain a motion vector (MV) corresponding to the corresponding block to be decoded and at the resolution of the current frame;
determining a reference block corresponding to each block to be decoded according to an MV corresponding to each block to be decoded; and
obtaining a reconstructed video frame according to each reference block and the encoded data.

2. The device according to claim 1, wherein the determining an MVP corresponding to each block to be decoded comprises:
determining, for a current block to be decoded in a process of processing each block to be decoded in the current frame, a reference frame in which a reference block corresponding to the current block to be decoded is located;
determining, in the reference frame, an image block corresponding to the current block to be decoded with respect to an image location; and
using an MV corresponding to the image block as an MVP of the current block to be decoded.

3. The device according to claim 2, wherein the using an MV corresponding to the image block as an MVP of the current block to be decoded comprises:
obtaining an MV corresponding to the image block at a resolution of the reference frame; and
transforming the MV corresponding to the image block to an MV at the resolution of the current frame in a case that the resolution of the reference frame is inconsistent with the resolution of the current frame, to obtain the MVP of the current block to be decoded.

4. The device according to claim 1, wherein the processing the MVD and the MVP corresponding to each block to be decoded at the same resolution after determining that a resolution of the current frame is inconsistent with the target resolution, to obtain an MV corresponding to the corresponding block to be decoded and at the resolution of the current frame comprises:
transforming, for a current block to be decoded in a process of processing each block to be decoded in the current frame, an MVD corresponding to the current block to be decoded to a target MVD at the resolution of the current frame in a case that an MVP corresponding to the current block to be decoded corresponds to the resolution of the current frame; and
obtaining an MV corresponding to the current block to be decoded and at the resolution of the current frame according to the target MVD and the MVP corresponding to the current block to be decoded.

5. The device according to claim 1, wherein the processing the MVD and the MVP corresponding to each block to be decoded at the same resolution after determining that a resolution of the current frame is inconsistent with the target resolution, to obtain an MV corresponding to the corresponding block to be decoded and at the resolution of the current frame comprises:
obtaining, for a current block to be decoded in a process of processing each block to be decoded in the current frame, an initial MV corresponding to the current block to be decoded according to an MVD and an MVP corresponding to the current block to be decoded in a case that the MVP corresponding to the current block to be decoded does not correspond to the resolution of the current frame but corresponds to the target resolution; and
transforming the initial MV to an MV at the resolution of the current frame.

6. The device according to claim 1, wherein the target resolution is a resolution of an original video frame corresponding to the encoded data or the resolution of the current frame.

7. A non-transitory computer-readable storage medium storing computer program instructions executable by at least one processor to perform:
obtaining encoded data corresponding to a current frame;
extracting a motion vector difference (MVD) corresponding to each block to be decoded in the current frame in the encoded data, a resolution corresponding to the MVD being a target resolution corresponding to a resolution configuration;
determining a motion vector prediction (MVP) corresponding to each block to be decoded;
processing the MVD and the MVP corresponding to each block to be decoded at a same resolution after determining that a resolution of the current frame is inconsistent with the target resolution, to obtain a motion vector (MV) corresponding to the corresponding block to be decoded and at the resolution of the current frame;

determining a reference block corresponding to each block to be decoded according to an MV corresponding to each block to be decoded; and obtaining a reconstructed video frame according to each reference block and the encoded data.

8. The storage medium according to claim 7, wherein the determining an MVP corresponding to each block to be decoded comprises:

determining, for a current block to be decoded in a process of processing each block to be decoded in the current frame, a reference frame in which a reference block corresponding to the current block to be decoded is located;

determining, in the reference frame, an image block corresponding to the current block to be decoded with respect to an image location; and using an MV corresponding to the image block as an MVP of the current block to be decoded.

9. The storage medium according to claim 8, wherein the using an MV corresponding to the image block as an MVP of the current block to be decoded comprises:

obtaining an MV corresponding to the image block at a resolution of the reference frame; and transforming the MV corresponding to the image block to an MV at the resolution of the current frame in a case that the resolution of the reference frame is inconsistent with the resolution of the current frame, to obtain the MVP of the current block to be decoded.

10. The storage medium according to claim 7, wherein the processing the MVD and the MVP corresponding to each block to be decoded at the same resolution after determining that a resolution of the current frame is inconsistent with the target resolution, to obtain an MV corresponding to the corresponding block to be decoded and at the resolution of the current frame comprises:

transforming, for a current block to be decoded in a process of processing each block to be decoded in the current frame, an MVD corresponding to the current block to be decoded to a target MVD at the resolution of the current frame in a case that an MVP corresponding to the current block to be decoded corresponds to the resolution of the current frame; and obtaining an MV corresponding to the current block to be decoded and at the resolution of the current frame according to the target MVD and the MVP corresponding to the current block to be decoded.

11. The storage medium according to claim 7, wherein the processing the MVD and the MVP corresponding to each block to be decoded at the same resolution after determining that a resolution of the current frame is inconsistent with the target resolution, to obtain an MV corresponding to the corresponding block to be decoded and at the resolution of the current frame comprises:

obtaining, for a current block to be decoded in a process of processing each block to be decoded in the current frame, an initial MV corresponding to the current block to be decoded according to an MVD and an MVP corresponding to the current block to be decoded in a case that the MVP corresponding to the current block to be decoded does not correspond to the resolution of the current frame but corresponds to the target resolution; and transforming the initial MV to an MV at the resolution of the current frame.

12. The storage medium according to claim 7, wherein the target resolution is a resolution of an original video frame corresponding to the encoded data or the resolution of the current frame.

13. A computer device, comprising: a memory storing computer instructions, and a processor coupled to the memory, wherein the processor is configured, when executing the computer instructions, to perform:

obtaining a current frame from a plurality of video frames to be encoded, at least two or more video frames from the plurality of video frames having different resolutions;

determining an initial motion vector (MV) corresponding to each block to be encoded in the current frame at a current resolution;

determining a target MV resolution according to a resolution configuration of the current frame to represent a target resolution;

determining a target MV corresponding to each block to be encoded in the current frame at the target resolution represented by the target MV resolution, including: transforming the initial MV to the target MV at the target resolution when the current resolution is inconsistent with the target resolution;

obtaining a motion vector prediction (MVP) corresponding to each block to be encoded in the current frame at the target resolution; and encoding the current frame according to a motion vector difference (MVD) between each target MV and the corresponding MVP such that the MV and the corresponding MVP are at a same resolution.

14. The device according to claim 13, wherein the determining a target MV corresponding to each block to be encoded in the current frame at a target resolution represented by the target MV resolution further comprises:

using the initial MV as the target MV at the target resolution when the current resolution is consistent with the target resolution.

15. The device according to claim 13, wherein the target resolution represented by the target MV resolution is an original resolution of an original video frame corresponding to the current frame; and the transforming the initial MV to the target MV at the target resolution comprises:

transforming the initial MV corresponding to each block to be encoded of the current frame to the target MV at the original resolution in a case that the current frame is obtained by processing the original video frame in a down-sampling processing manner.

16. The device according to claim 13, wherein the transforming the initial MV to the target MV at the target resolution comprises:

determining a first vector transformation coefficient according to a current resolution of the current frame and the target MV resolution; and transforming the initial MV to the target MV at the target resolution according to the first vector transformation coefficient.

17. The device according to claim 13, wherein the obtaining an MVP corresponding to each block to be encoded and at the target resolution comprises:

determining, for a current block to be encoded in a process of encoding each block to be encoded in the current frame, a reference frame in which a reference block corresponding to the current block to be encoded is located;

determining, in the reference frame, an image block corresponding to the current block to be encoded with respect to an image location; and obtaining a target MV corresponding to the image block and at the target resolution as an MVP of the current block to be encoded.

18. The device according to claim 17, wherein the target resolution represented by the target MV resolution information is a current resolution of the current frame; and the obtaining a target MV corresponding to the image block and at the target resolution as an MVP of the current block to be encoded comprises:

obtaining an initial MV of the image block at a resolution of the reference frame; and transforming the initial MV of the image block to a target MV at the current resolution as the MVP of the current block to be encoded in a case that the resolution of the reference frame is inconsistent with the current resolution.

19. The device according to claim 18, wherein the transforming the initial MV of the image block to a target MV at the current resolution as the MVP of the current block to be encoded comprises:

obtaining a second vector transformation coefficient according to a resolution of the reference frame and the target MV resolution representing the current resolution; and transforming, according to the second vector transformation coefficient, the initial MV of the image block to the target MV at the current resolution as the MVP of the current block to be encoded.

20. The device according to claim 13, wherein the obtaining a current frame comprises:

obtaining the original video frame;

obtaining a processing manner corresponding to the original video frame; and processing the original video frame in the processing manner, to obtain the current frame, the processing manner being a full resolution processing manner or the down-sampling processing manner.

* * * * *